(12) United States Patent
Tang et al.

(10) Patent No.: US 12,706,646 B2
(45) Date of Patent: Aug. 11, 2026

(54) ARTIFICIAL INTELLIGENCE-ENABLED LINK ADAPTATION

(71) Applicant: HUAWEI TECHNOLOGIES CO., LTD., Shenzhen (CN)

(72) Inventors: Hao Tang, Shenzhen (CN); Jianglei Ma, Kanata (CA); Xiaoyan Bi, Shenzhen (CN); Peiying Zhu, Kanata (CA); Wen Tong, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 232 days.

(21) Appl. No.: 18/525,765

(22) Filed: Nov. 30, 2023

(65) Prior Publication Data

US 2024/0106508 A1 Mar. 28, 2024

Related U.S. Application Data

(63) Continuation of application No. PCT/CN2021/099911, filed on Jun. 12, 2021.

(51) Int. Cl.
*H04B 7/06* (2006.01)
*H04L 1/00* (2006.01)
(Continued)

(52) U.S. Cl.
CPC ......... *H04B 7/0626* (2013.01); *H04L 1/0003* (2013.01); *H04L 5/0051* (2013.01); *H04W 24/02* (2013.01)

(58) Field of Classification Search
CPC ... H04B 7/0626; H04L 1/0003; H04L 5/0051; H04L 1/0009; H04L 1/0015;
(Continued)

(56) References Cited

U.S. PATENT DOCUMENTS

2016/0191214 A1* 6/2016 Hong .................... H04L 25/067 370/252
2020/0177257 A1* 6/2020 Nammi ................ H04B 7/0626
(Continued)

FOREIGN PATENT DOCUMENTS

CN 107994973 A 5/2018
CN 108462517 A 8/2018
(Continued)

OTHER PUBLICATIONS

A. Tato and C. Mosquera, "Spatial Modulation Link Adaptation: a Deep Learning Approach," 2019 53rd Asilomar Conference on Signals, Systems, and Computers, Pacific Grove, CA, USA, Nov. 3, 2019, total 5 pages.
(Continued)

*Primary Examiner* — Abdullahi E Salad
(74) *Attorney, Agent, or Firm* — Slater Matsil, LLP

(57) ABSTRACT

Signaling resource overhead associated with current communication link adaptation mechanisms can be quite large and such mechanisms typically rely upon a channel state information (CSI) feedback process that can result in poor scheduling performance. Embodiments are disclosed in which a first device channel state information characterizing a wireless communication channel between the first device and a second device, and trains a machine learning (ML) module of the first device using the CSI as an ML module input and one or more modulation and coding scheme (MCS) parameters as an ML module output to satisfy a training target. By applying the concepts disclosed herein, overhead associated with feedback for MCS selection may be reduced compared to conventional link adaptation procedures, because, once ML modules at a pair of devices have been trained, the MCS selection by the ML modules can be done without requiring the ongoing feedback of CSI.

20 Claims, 18 Drawing Sheets

(51) Int. Cl.
*H04L 5/00* (2006.01)
*H04W 24/02* (2009.01)

(58) Field of Classification Search
CPC ............... H04L 1/0029; H04L 25/0224; H04L 25/0254; H04W 24/02; G06N 3/063; G06N 3/084; G06N 3/0455; G06N 3/088
See application file for complete search history.

(56) References Cited

U.S. PATENT DOCUMENTS

| | | | | |
|---|---|---|---|---|
| 2020/0287639 | A1* | 9/2020 | Su | H04L 1/0061 |
| 2020/0403723 | A1* | 12/2020 | Hoydis | G06N 3/0499 |
| 2021/0273707 | A1* | 9/2021 | Yoo | H04L 1/0045 |
| 2021/0345134 | A1* | 11/2021 | Ottersten | G06N 3/006 |
| 2022/0094411 | A1* | 3/2022 | Yoo | G06N 3/0455 |

FOREIGN PATENT DOCUMENTS

| | | | |
|---|---|---|---|
| CN | 111901024 | A | 11/2020 |
| CN | 112910520 | A | 6/2021 |
| WO | 2020010566 | A1 | 1/2020 |
| WO | 2021049984 | A1 | 3/2021 |

OTHER PUBLICATIONS

M. Rathinasabapathy and R. Nakkeeran, "Performance analysis of adaptive OFDM system for Broadband Power Line Network," IEEE—International Conference On Advances In Engineering, Science And Management (ICAESM—2012), Nagapattinam, India, Mar. 30, 2012, total 7 pages.

Lihuan Huang et al., "Adaptive modulation and coding in underwater acoustic communications: a machine learning perspective", EURASIP Journal on Wireless Communication and Networking, Oct. 17, 2020, total 25 pages.

3GPP TS 38.211, V16.3.0, "Physical channels and modulation", Release 16, Sep. 2020, 133 pages.

3GPP TS 38.212 V16.3.0, "Multiplexing and channel coding", Release 16, Sep. 2020, 71 pages.

3GPP TS 38.213 V16.3.0, "Physical layer procedures for control", Release 16, Sep. 2020, 179 pages.

3GPP TS 38.214 V16.3.0, "Physical layer procedures for data", Release 16, Sep. 2020, 156 pages.

3GPP TS 38.331 V16.3.0, "Radio Resource Control (RRC) protocol specification", Release 16, Dec. 2020, 294 pages.

Deutsche Telekom, 3GPP TSG-RAN3 Meeting #110-e, "Use cases for AI/ML in RAN and potential benefits", R3-206198, E-meeting, Nov. 2-12, 2020, 4 pages.

3GPP TSG-RAN3 Meeting #110-e, R3-206198, "Use cases for AI/ML in RAN and potential benefits", Deutsche Telekom, E-meeting, Nov. 2-12, 2020, total 4 pages.

* cited by examiner

ARTIFICIAL INTELLIGENCE-ENABLED LINK ADAPTATION

RELATED APPLICATION

This application is a continuation of International Application No. PCT/CN2021/099911, filed on Jun. 12, 2021, the disclosure of which is hereby incorporated by reference in its entirety.

TECHNICAL FIELD

The present disclosure relates to wireless communication generally, and, in particular embodiments, to methods and apparatuses for communication link adaptation.

BACKGROUND

Communications in wireless communications systems typically occur over non-ideal channels. For example, non-ideal conditions such as electromagnetic interference, signal degradation, phase delays, fading, and other non-idealities may attenuate and/or distort a communication signal or may otherwise interfere with or degrade the communications capabilities of the system. Moreover, compensating for these and other channel non-idealities can be complicated by the dynamic variation that is often associated with many of these factors.

Communications systems may employ link adaptation technologies to adjust communications parameters based on variations of communications channel condition values. For example, in order to handle variations in the instantaneous radio-link quality, a typical solution is link adaptation by means of rate control, which adjusts the modulation scheme and/or the channel coding rate according to the instantaneous channel state information (CSI). For example, such link adaptation may be employed to increase the strength of channel coding when communicating through a relatively noisy channel and to decrease the strength of channel coding when communicating through a relatively noise free channel. In this example, the strength of the channel coding may be adjusted to balance the transmission rate of payload data with the ability of the receiver to recover the payload data from the non-ideal channel. In such a manner, link adaptation may be employed to improve the throughput of payload data over a wide range of channel conditions.

However, there are limitations in the mechanisms currently available for link adaptation. For example, the signaling resource overhead associated with current link adaptation mechanisms can be quite large. In addition, because current link adaptation mechanisms generally rely upon CSI feedback, the delay inherent to the feedback process can result in poor scheduling performance if the channel quality changes substantially between the time of data scheduling and the time at which the CSI measurement was obtained.

SUMMARY

According to a first broad aspect of the present disclosure, there is provided herein a method in a first device in a wireless communication network. The method may include obtaining channel state information characterizing a wireless communication channel between the first device and a second device in the wireless communication network, and training a machine learning (ML) module of the first device using the channel state information as an ML module input and one or more modulation and coding scheme (MCS)

parameters as an ML module output to satisfy a training target. In some embodiments, the one or more MCS parameters may include a predicted modulation order, a predicted coding rate or both.

By applying the concepts disclosed herein, overhead associated with feedback from a receiving device to a transmitting device for MCS selection may be greatly reduced compared to conventional link adaptation procedures, because, once ML modules at the pair of devices have been trained, the MCS selection by the ML modules can be done without requiring the ongoing feedback of channel state information that may be used for MCS selection in conventional link adaptation procedures.

Optionally, in any of the previous embodiments, obtaining the channel state information includes receiving, from the second device, a reference signal, and determining the channel state information based on the reference signal. For example, in such embodiments, the first device may be a user equipment (UE) and the second device may be a network device, and the method may further include receiving, from the network device, training data corresponding to the reference signal. Optionally, in any of the previous embodiments, the training data may include information indicating one or more MCS parameters predicted by the network device. For example, the one or more MCS parameters may include a predicted modulation order, a predicted coding rate or both. In such embodiments, training a ML module of the first device to satisfy a training target may include training the ML module of the UE to satisfy a training target of matching the one or more MCS parameters of the ML module output of the ML module of the UE to the one or more MCS parameters predicted by the network device.

Optionally, in any of the previous embodiments, the method may further include transmitting, to the network device, a channel state information report that includes information indicating the channel state information determined by the UE based on the reference signal received from the network device.

Optionally, in any of the previous embodiments, the method may further include obtaining, based on the channel state information as an input to a ML encoder module of the UE, compressed channel state information. In such embodiments, transmitting the channel state information report to the network device may include transmitting the compressed channel state information to the network device.

Optionally, in any of the previous embodiments in which the first device is a UE and the second device is a network device, the method further includes transmitting, from the UE, a reference signal. In such embodiments, obtaining the channel state information may include receiving, from the network device, a channel state information report that includes information indicating uplink channel state information determined by the network device based on the reference signal transmitted by the UE. The uplink channel state information may be used as the ML module input in such embodiments. In such embodiments, the method may further include transmitting, to the UE, training data corresponding to the reference signal. For example, the training data may include information indicating the one or more MCS parameters of the ML module output of the ML module of the network device, e.g., a predicted modulation order, a predicted coding rate or both.

Optionally, in any of the previous embodiments, the first device is a network device and the second device is a UE. In some such embodiments, the method may further include transmitting, from the network device, a reference signal. In such embodiments, obtaining the channel state information may include receiving, from the UE, a channel state information report that includes information indicating downlink channel state information determined by the UE based on the reference signal transmitted by the network device. The downlink channel state information may be used as the ML module input in such embodiments.

Optionally, in any of the previous embodiments, the channel state information report includes compressed downlink channel state information. In such embodiments, obtaining the channel state information may further include decoding the compressed downlink channel state information to generate reconstructed downlink channel state information, and using the downlink channel state information as the ML module input may include using the reconstructed downlink channel state information as the ML module input.

Optionally, in any of the previous embodiments, training the ML module of the first device includes training the ML module of the first device and a ML module of the second device together, using joint optimization. For example, the ML module of the first device and the ML module of the second device may be trained together to satisfy: i) a first training target of matching one or more MCS parameters of an ML module output of the ML module of the second device to the one or more MCS parameters of the ML module output of the ML module of the first device; and ii) a second training target of optimizing one or more performance metrics for communication between the first device and the second device.

Optionally, in any of the previous embodiments, the one or more performance metrics includes throughput. In such embodiments, the second training target may include maximizing the throughput of communication between the first device and the second device, for example.

Optionally, in any of the previous embodiments, after determining that training has converged to satisfy the first and second training targets, trained weights for the ML module of the second device may be transmitted to the second device to enable the second device to implement the ML module.

Optionally, in any of the previous embodiments, the reference signal includes a plurality of training signals in different time-frequency resource block locations. In such embodiments, the plurality of training signals may include training signals with different modulation orders, different coding rates or both different modulation orders and different coding rates. For example, the downlink channel state information may include one or more of: at least one channel quality indicator (CQI) value; at least one reference signal received power (RSRP) value; at least one rank indicator (RI) value; at least one pre-coding matrix indicator (PMI) value; at least one signal to noise ratio (SNR) value; or at least one signal to interference-plus-noise ratio (SINR) value.

By applying the concepts disclosed herein, a pair of communicating devices each have a ML module that is trained to predict the same optimal real-time MCS based on the allocated RBs and channel state information so that the receiving device (e.g., a UE) can accurately predict the MCS used by the transmitting device (e.g., a TRP) for a scheduled transmission based on the allocated RBs on which the transmission has been scheduled and the current channel state information at the receiving device.

Optionally, in any of the previous embodiments, training the ML module includes training the ML module using the channel state information and the time-frequency resource block locations as ML module inputs and the one or more MCS parameters as the ML module output to satisfy the training target.

Optionally, in any of the previous embodiments, the method further includes obtaining channel state information characterizing the wireless communication channel between the network device and the UE, obtaining one or more time-frequency resource block locations for transmitting a transport block to the UE, and obtaining, based on the channel state information and the one or more time-frequency resource block locations as inputs to the ML module, one or more MCS parameters associated with the one or more time-frequency resource block locations. In some such embodiments, the method may further include transmitting, to the UE, scheduling information, the scheduling information identifying the one or more time-frequency resource block locations for transmitting the transport block to the UE, and transmitting the transport block to the UE over the wireless communication channel using the one or more MCS parameters and the associated one or more time-frequency resource block locations.

Optionally, in any of the previous embodiments, transmitting the scheduling information includes transmitting the scheduling information in downlink control information (DCI). For example, the DCI may include one or more of the following fields: a) a ML module output indication field for indicating which performance metric from among a plurality of performance metrics the one or more MCS parameters for transmitting the transport block have been optimized; or b) a transport block mapping indication field for indicating, which transport block mapping method from among a plurality of transport block mapping methods has been selected for the transport block. For example, the plurality of transport block mapping methods may include two or more of the following: i) a transport block mapping method in which there is one transport block-level modulation order and one transport block-level coding rate; ii) a transport block mapping method in which there are subband-level modulation orders and one transport block-level coding rate; iii) a transport block mapping method in which there are subband-level modulation orders and multiple subband-level coding rates.

According to a second broad aspect of the present disclosure, there is provided herein another method in a first device in a wireless communication network. The method may include obtaining channel state information characterizing a wireless communication channel between the first device and a second device in the wireless communication network. Optionally, in any of the previous embodiments, the method may further include obtaining, based on the channel state information as an input to a ML module that has been trained using channel state information characterizing a wireless communication channel between the first device and the second device in the wireless communication network as an ML module input and one or more MCS parameters as an ML module output, one or more MCS parameters for communication between the first device and the second device. For example, the one or more MCS parameters may include a predicted modulation order, a predicted coding rate or both. Optionally, in any of the previous embodiments, the method may further include transmitting to or receiving from the second device over the wireless communication channel using the one or more MCS parameters.

Optionally, in any of the previous embodiments, obtaining the channel state information includes receiving, from the second device, a reference signal, and determining the channel state information based on the reference signal.

Optionally, in any of the previous embodiments, the first device is a user equipment (UE), the second device is a network device, the ML module used to obtain the one or more MCS is trained to satisfy a training target of matching the one or more MCS parameters of the ML module output of the ML module of the UE to one or more MCS parameters predicted by the network device.

Optionally, in any of the previous embodiments, the first device is a user equipment (UE), the second device is a network device, and the method further includes: obtaining, based on the channel state information as an input to a ML encoder module of the UE, compressed channel state information; and transmitting a channel state information report to the network device, the channel state information report including the compressed channel state information.

Optionally, in any of the previous embodiments, the first device is a user equipment (UE) and the second device is a network device, and the method further includes transmitting, from the UE, a reference signal. In such embodiments, obtaining the channel state information may include receiving, from the network device, a channel state information report that includes information indicating uplink channel state information determined by the network device based on the reference signal transmitted by the UE. In such embodiments, using the channel state information as an ML module input may include using the uplink channel state information as the ML module input.

Optionally, in any of the previous embodiments, the first device is a network device and the second device is a user equipment (UE), an the method further includes transmitting, from the network device, a reference signal, wherein obtaining the channel state information includes receiving, from the UE, a channel state information report that includes information indicating downlink channel state information determined by the UE based on the reference signal transmitted by the network device. In such embodiments, using the channel state information as an ML module input may include using the downlink channel state information as the ML module input.

Optionally, in any of the previous embodiments, the channel state information report includes compressed downlink channel state information, obtaining the channel state information further includes decoding the compressed downlink channel state information to generate reconstructed downlink channel state information, and using the downlink channel state information as the ML module input includes using the reconstructed downlink channel state information as the ML module input.

Optionally, in any of the previous embodiments, decoding the compressed downlink channel state information to generate reconstructed downlink channel state information includes decoding the compressed downlink channel state information using an ML decoder module that is the compliment of an ML encoder module used by the UE to generate the compressed downlink channel state information.

Optionally, in any of the previous embodiments, the first device is a network device and the second device is a UE, receiving, from the second device, a reference signal includes receiving a reference signal from the UE, determining the channel state information based on the reference signal includes determining uplink channel state information based on the reference signal received from the UE, and using the channel state information as an ML module input includes using the uplink channel state information as the ML module input.

Optionally, in any of the previous embodiments, the method further includes transmitting, to the UE, a channel state information report that includes information indicating the uplink channel state information determined by the network device based on the reference signal received from the UE.

Optionally, in any of the previous embodiments, the first device is a network device and the second device is a UE; and the ML module used to obtain the one or more MCS parameters is trained to satisfy a training target of optimizing one or more performance metrics for downlink communication between the network device and the UE.

Optionally, in any of the previous embodiments, the ML module used to obtain the one or more MCS parameters is trained to maximize throughput of downlink communication between the network device and the UE.

Optionally, in any of the previous embodiments, the first device is a network device and the second device is a UE, and the method further includes: obtaining, based on the one or more MCS parameters for communication between the first device and the second device as an input to a ML encoder module of the network device, compressed MCS parameter information; and transmitting, to the UE, the compressed MCS parameter information.

Optionally, in any of the previous embodiments, the first device is a user equipment (UE) and the second device is a network device, and the method further includes: receiving, from the network device, compressed MCS parameter information, wherein obtaining the one or more MCS parameters for communication between the UE and the network device is further based on the compressed MCS parameter information as an input to the ML module of the UE.

Optionally, in any of the previous embodiments, the method further includes obtaining one or more time-frequency resource block locations for transmitting a transport block to the UE, wherein obtaining one or more MCS parameters for communication between the first device and the second device includes obtaining, based on the channel state information and the one or more time-frequency resource block locations as inputs to the ML module configured using the trained weights, one or more MCS parameters associated with the one or more time-frequency resource block locations.

Optionally, in any of the previous embodiments, the method further includes: transmitting, to the UE, scheduling information, the scheduling information identifying the one or more time-frequency resource block locations for transmitting the transport block to the UE; and transmitting the transport block to the UE over the wireless communication channel using the one or more MCS parameters and the associated one or more time-frequency resource block locations.

Corresponding apparatuses and devices are disclosed for performing the methods.

For example, according to another aspect of the disclosure, a device is provided that includes a processor and a memory storing processor-executable instructions that, when executed, cause the processor to carry out a method according to the first broad aspect of the present disclosure described above.

According to another aspect of the disclosure, a device is provided that includes a processor and a memory storing processor-executable instructions that, when executed, cause the processor to carry out a method according to the second broad aspect of the present disclosure described above.

According to other aspects of the disclosure, an apparatus including one or more units for implementing any of the method aspects as disclosed in this disclosure is provided. The term "units" is used in a broad sense and may be referred to by any of various names, including for example, modules, components, elements, means, etc. The units can be implemented using hardware, software, firmware or any combination thereof.

BRIEF DESCRIPTION OF THE DRAWINGS

Reference will now be made, by way of example only, to the accompanying drawings which show example embodiments of the present application, and in which.

Similar reference numerals may have been used in different figures to denote similar components.

DETAILED DESCRIPTION

For illustrative purposes, specific example embodiments will now be explained in greater detail below in conjunction with the figures.

Example Communication Systems and Devices

Figure 1:
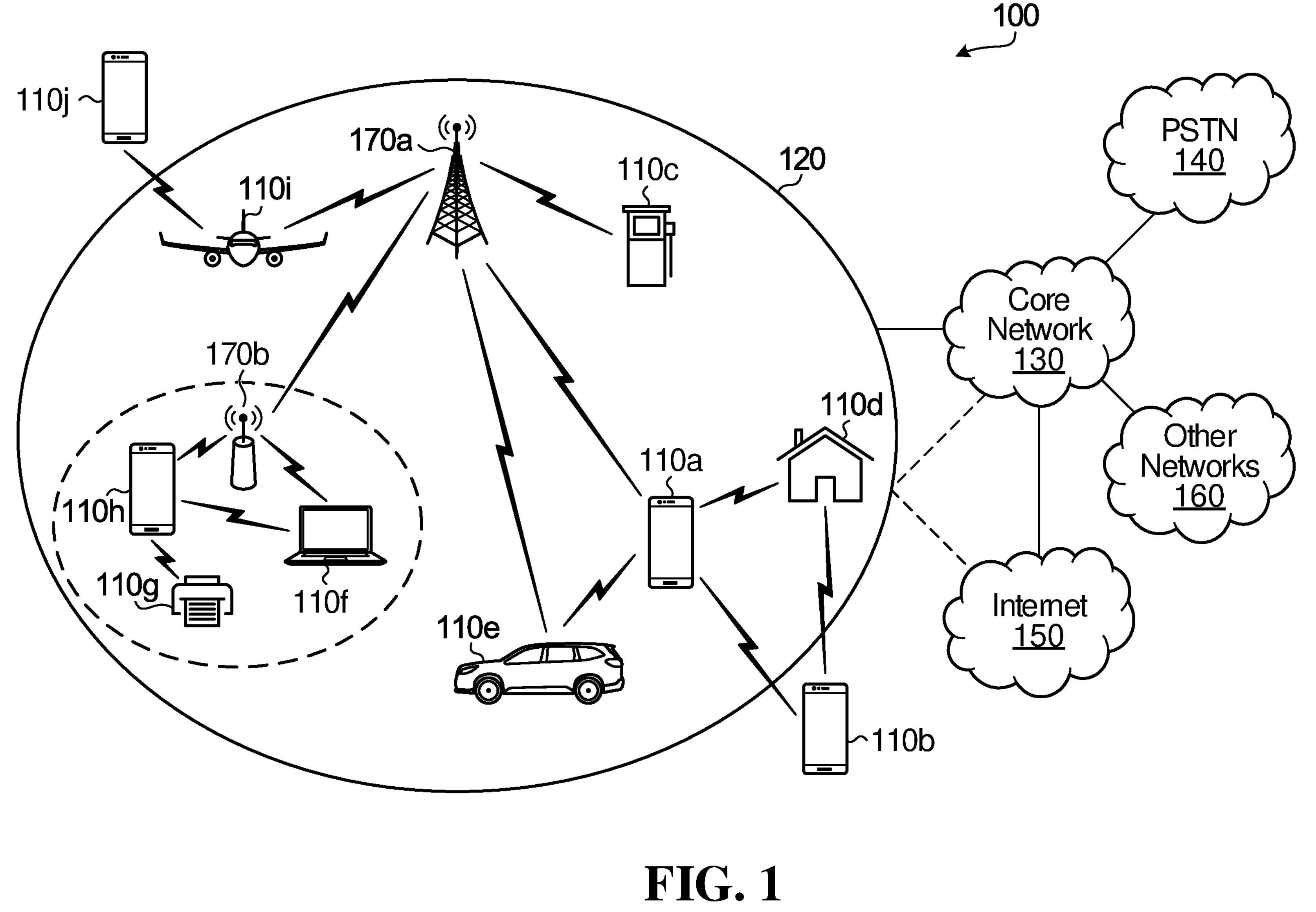
FIG. 1 is a simplified schematic illustration of a communication system, according to one example.

Referring to FIG. 1, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110*a*-120*j* (generically referred to as 110) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. Also, the communication system 100 comprises a public switched telephone network (PSTN) 140, the internet 150, and other networks 160.

Figure 2:
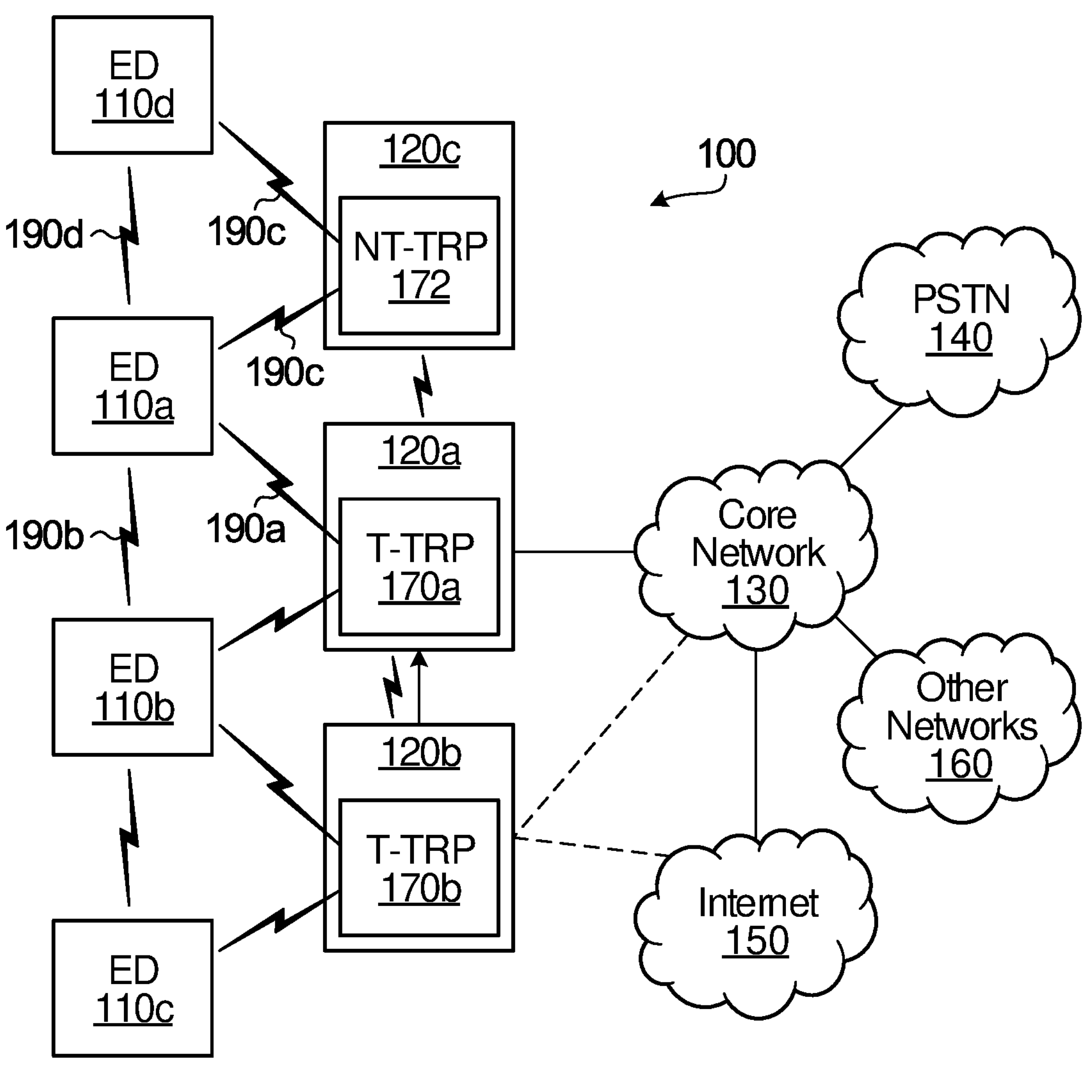
FIG. 2 illustrates another example of a communication system.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 100 includes electronic devices (ED) 110*a*-110*d* (generically referred to as ED 110), radio access networks (RANs) 120*a*-120*b*, non-terrestrial communication network 120*c*, a core network 130, a public switched telephone network (PSTN) 140, the internet 150, and other networks 160. The RANs 120*a*-120*b* include respective base stations (BSs) 170*a*-170*b*, which may be generically referred to as terrestrial transmit and receive points (T-TRPs) 170*a*-170*b*. The non-terrestrial communication network 120*c* includes an access node 120*c*, which may be generically referred to as a non-terrestrial transmit and receive point (NT-TRP) 172.

Any ED 110 may be alternatively or additionally configured to interface, access, or communicate with any other T-TRP 170*a*-170*b* and NT-TRP 172, the internet 150, the core network 130, the PSTN 140, the other networks 160, or any combination of the preceding. In some examples, ED 110*a* may communicate an uplink and/or downlink transmission over an interface 190*a* with T-TRP 170*a*. In some examples, the EDs 110*a*, 110*b* and 110*d* may also communicate directly with one another via one or more sidelink air interfaces 190*b*. In some examples, ED 110*d* may communicate an uplink and/or downlink transmission over an interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120*a* and 120*b* are in communication with the core network 130 to provide the EDs 110*a* 110*b*, and 110*c* with various services such as voice, data, and other services. The RANs 120*a* and 120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a* and 120*b* or EDs 110*a* 110*b*, and 110*c* or both, and (ii) other networks (such as the PSTN 140, the internet 150, and the other networks 160). In addition, some or all of the EDs 110*a* 110*b*, and 110*c* may include functionality for communicating with different wireless networks over different wireless links using different wireless technologies and/or protocols. Instead of wireless communication (or in addition thereto), the EDs 110*a* 110*b*, and 110*c* may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110*a* 110*b*, and 110*c* may be multimode devices capable of operation according to multiple radio access technologies and incorporate multiple transceivers necessary to support such.

Figure 3:
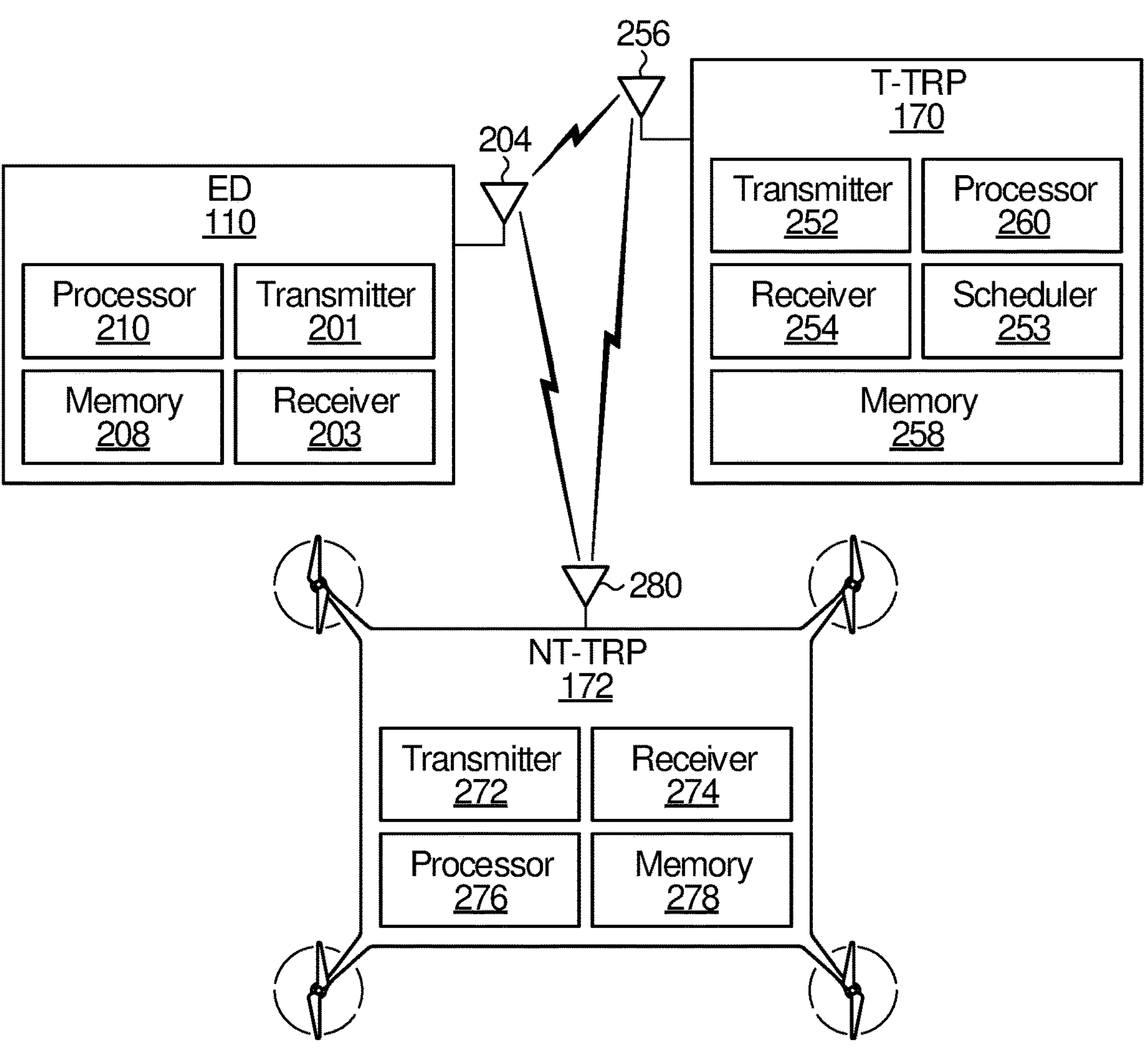
FIG. 3 illustrates an example of an electronic device (ED), a terrestrial transmit and receive point (T-TRP), and a non-terrestrial transmit and receive point (NT-TRP)

FIG. 3 illustrates another example of an ED 110 and a base station 170*a*, 170*b* and/or 170*c*. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170*a* and 170*b* is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

Note that "TRP", as used herein, may refer to a T-TRP or a NT-TRP.

The T-TRP 170, the NT-TRP 172, and/or the ED 110 may include other components, but these have been omitted for the sake of clarity.

Figure 4:
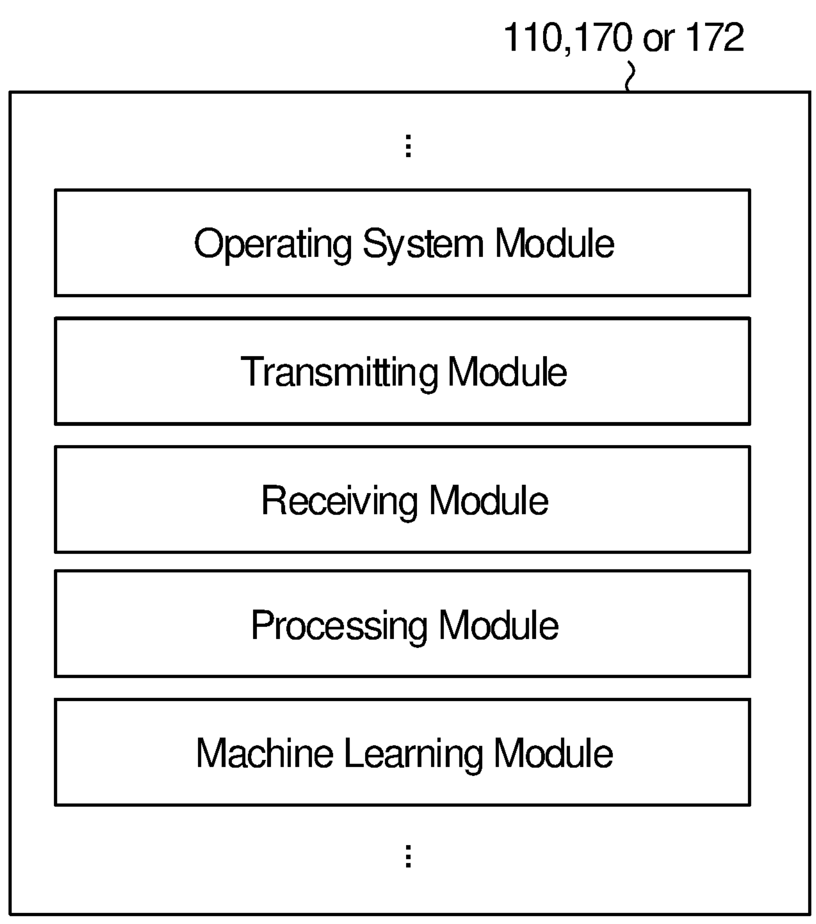
FIG. 4 illustrates example units or modules in a device.

One or more steps of the embodiment methods provided herein may be performed by corresponding units or modules, according to FIG. 4. FIG. 4 illustrates units or modules in a device, such as in ED 110, in T-TRP 170, or in NT-TRP 172. For example, a signal may be transmitted by a transmitting unit or a transmitting module. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Control signaling is discussed herein in some embodiments. Control signaling may sometimes instead be referred to as signaling, or control information, or configuration information, or a configuration. In some cases, control signaling may be dynamically indicated, e.g. in the physical layer in a control channel. An example of control signaling that is dynamically indicated is information sent in physical layer control signaling, e.g. downlink control information (DCI). Control signaling may sometimes instead be semi-statically indicated, e.g. in RRC signaling or in a MAC control element (CE). A dynamic indication may be an indication in lower layer, e.g. physical layer/layer 1 signaling (e.g. in DCI), rather than in a higher-layer (e.g. rather than in RRC signaling or in a MAC CE). A semi-static indication may be an indication in semi-static signaling. Semi-static signaling, as used herein, may refer to signaling that is not dynamic, e.g. higher-layer signaling, RRC signaling, and/or a MAC CE. Dynamic signaling, as used herein, may refer to signaling that is dynamic, e.g. physical layer control signaling sent in the physical layer, such as DCI.

An air interface generally includes a number of components and associated parameters that collectively specify how a transmission is to be sent and/or received over a wireless communications link between two or more communicating devices. For example, an air interface may include one or more components defining the waveform(s), frame structure(s), multiple access scheme(s), protocol(s), coding scheme(s) and/or modulation scheme(s) for conveying information (e.g. data) over a wireless communications link. The wireless communications link may support a link between a radio access network and user equipment (e.g. a "Uu" link), and/or the wireless communications link may support a link between device and device, such as between two user equipments (e.g. a "sidelink"), and/or the wireless communications link may support a link between a non-terrestrial (NT)-communication network and user equipment (UE). The followings are some examples for the above components:

A waveform component may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF).

A frame structure component may specify a configuration of a frame or group of frames. The frame structure component may indicate one or more of a time, frequency, pilot signature, code, or other parameter of the frame or group of frames. More details of frame structure will be discussed below.

A multiple access scheme component may specify multiple access technique options, including technologies defining how communicating devices share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, multiple access technique options may include: scheduled access vs. non-scheduled access, also known as grant-free access; non-orthogonal multiple access vs. orthogonal multiple access, e.g., via a dedicated channel resource (e.g., no sharing between multiple communicating devices); contention-based shared channel resources vs. non-contention-based shared channel resources, and cognitive radio-based access.

A hybrid automatic repeat request (HARQ) protocol component may specify how a transmission and/or a re-transmission is to be made. Non-limiting examples of transmission and/or re-transmission mechanism options include those that specify a scheduled data pipe size, a signaling mechanism for transmission and/or re-transmission, and a re-transmission mechanism.

A coding and modulation component may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low PAPR modulation.

In some embodiments, the air interface may be a "one-size-fits-all concept". For example, the components within the air interface cannot be changed or adapted once the air interface is defined. In some implementations, only limited parameters or modes of an air interface, such as a cyclic prefix (CP) length or a multiple input multiple output (MIMO) mode, can be configured. In some embodiments, an air interface design may provide a unified or flexible framework to support below 6 GHz and beyond 6 GHz frequency (e.g., mmWave) bands for both licensed and unlicensed access. As an example, flexibility of a configurable air interface provided by a scalable numerology and symbol duration may allow for transmission parameter optimization for different spectrum bands and for different services/devices. As another example, a unified air interface may be self-contained in a frequency domain, and a frequency domain self-contained design may support more flexible radio access network (RAN) slicing through channel resource sharing between different services in both frequency and time.

Frame Structure

A frame structure is a feature of the wireless communication physical layer that defines a time domain signal transmission structure, e.g. to allow for timing reference and timing alignment of basic time domain transmission units. Wireless communication between communicating devices may occur on time-frequency resources governed by a frame structure. The frame structure may sometimes instead be called a radio frame structure.

Depending upon the frame structure and/or configuration of frames in the frame structure, frequency division duplex (FDD) and/or time-division duplex (TDD) and/or full duplex (FD) communication may be possible. FDD communication is when transmissions in different directions (e.g. uplink vs. downlink) occur in different frequency bands. TDD communication is when transmissions in different directions (e.g. uplink vs. downlink) occur over different time durations. FD communication is when transmission and reception occurs on the same time-frequency resource, i.e. a device can both transmit and receive on the same frequency resource concurrently in time.

One example of a frame structure is a frame structure in long-term evolution (LTE) having the following specifications: each frame is 10 ms in duration; each frame has 10 subframes, which are each 1 ms in duration; each subframe includes two slots, each of which is 0.5 ms in duration; each slot is for transmission of 7 OFDM symbols (assuming normal CP); each OFDM symbol has a symbol duration and a particular bandwidth (or partial bandwidth or bandwidth partition) related to the number of subcarriers and subcarrier spacing; the frame structure is based on OFDM waveform parameters such as subcarrier spacing and CP length (where the CP has a fixed length or limited length options); and the switching gap between uplink and downlink in TDD has to be the integer time of OFDM symbol duration.

Another example of a frame structure is a frame structure in new radio (NR) having the following specifications: multiple subcarrier spacings are supported, each subcarrier spacing corresponding to a respective numerology; the frame structure depends on the numerology, but in any case the frame length is set at 10 ms, and consists of ten subframes of 1 ms each; a slot is defined as 14 OFDM symbols, and slot length depends upon the numerology. For example, the NR frame structure for normal CP 15 kHz subcarrier spacing ("numerology 1") and the NR frame structure for normal CP 30 kHz subcarrier spacing ("numerology 2") are different. For 15 kHz subcarrier spacing a slot length is 1 ms, and for 30 kHz subcarrier spacing a slot length is 0.5 ms. The NR frame structure may have more flexibility than the LTE frame structure.

Another example of a frame structure is an example flexible frame structure, e.g. for use in a 6G network or later. In a flexible frame structure, a symbol block may be defined as the minimum duration of time that may be scheduled in the flexible frame structure. A symbol block may be a unit of transmission having an optional redundancy portion (e.g. CP portion) and an information (e.g. data) portion. An OFDM symbol is an example of a symbol block. A symbol block may alternatively be called a symbol. Embodiments of flexible frame structures include different parameters that may be configurable, e.g. frame length, subframe length, symbol block length, etc. A non-exhaustive list of possible configurable parameters in some embodiments of a flexible frame structure include:

(1) Frame: The frame length need not be limited to 10 ms, and the frame length may be configurable and change over time. In some embodiments, each frame includes one or multiple downlink synchronization channels and/or one or multiple downlink broadcast channels, and each synchronization channel and/or broadcast channel may be transmitted in a different direction by different beamforming. The frame length may be more than one possible value and configured based on the application scenario. For example, autonomous vehicles may require relatively fast initial access, in which case the frame length may be set as 5 ms for autonomous vehicle applications. As another example, smart meters on houses may not require fast initial access, in which case the frame length may be set as 20 ms for smart meter applications.

(2) Subframe duration: A subframe might or might not be defined in the flexible frame structure, depending upon the implementation. For example, a frame may be defined to include slots, but no subframes. In frames in which a subframe is defined, e.g. for time domain alignment, then the duration of the subframe may be configurable. For example, a subframe may be configured to have a length of 0.1 ms or 0.2 ms or 0.5 ms or 1 ms or 2 ms or 5 ms, etc. In some embodiments, if a subframe is not needed in a particular scenario, then the subframe length may be defined to be the same as the frame length or not defined.

(3) Slot configuration: A slot might or might not be defined in the flexible frame structure, depending upon the implementation. In frames in which a slot is defined, then the definition of a slot (e.g. in time duration and/or in number of symbol blocks) may be configurable. In one embodiment, the slot configuration is common to all UEs or a group of UEs. For this case, the slot configuration information may be transmitted to UEs in a broadcast channel or common control channel(s). In other embodiments, the slot configuration may be UE specific, in which case the slot configuration information may be transmitted in a UE-specific control channel. In some embodiments, the slot configuration signaling can be transmitted together with frame configuration signaling and/or subframe configuration signaling. In other embodiments, the slot configuration can be transmitted independently from the frame configuration signaling and/or subframe configuration signaling. In general, the slot configuration may be system common, base station common, UE group common, or UE specific.

(4) Subcarrier spacing (SCS): SCS is one parameter of scalable numerology which may allow the SCS to possibly range from 15 KHz to 480 KHz. The SCS may vary with the frequency of the spectrum and/or maximum UE speed to minimize the impact of the Doppler shift and phase noise. In some examples, there may be separate transmission and reception frames, and the SCS of symbols in the reception frame structure may be configured independently from the SCS of symbols in the transmission frame structure. The SCS in a reception frame may be different from the SCS in a transmission frame. In some examples, the SCS of each transmission frame may be half the SCS of each reception frame. If the SCS between a reception frame and a transmission frame is different, the difference does not necessarily have to scale by a factor of two, e.g. if more flexible symbol durations are implemented using inverse discrete Fourier transform (IDFT) instead of fast Fourier transform (FFT). Additional examples of frame structures can be used with different SCSs.

(5) Flexible transmission duration of basic transmission unit: The basic transmission unit may be a symbol block (alternatively called a symbol), which in general includes a redundancy portion (referred to as the CP) and an information (e.g. data) portion, although in some embodiments the CP may be omitted from the symbol block. The CP length may be flexible and configurable. The CP length may be fixed within a frame or flexible within a frame, and the CP length may possibly change from one frame to another, or from one group of frames to another group of frames, or from one subframe to another subframe, or from one slot to another slot, or dynamically from one scheduling to another scheduling. The information (e.g. data) portion may be flexible and configurable. Another possible parameter relating to a symbol block that may be defined is ratio of CP duration to information (e.g. data) duration. In some embodiments, the symbol block length may be adjusted according to: channel condition (e.g. mulit-path delay, Doppler); and/or latency requirement; and/or available time duration. As another example, a symbol block length may be adjusted to fit an available time duration in the frame.

(6) Flexible switch gap: A frame may include both a downlink portion for downlink transmissions from a base station, and an uplink portion for uplink transmissions from UEs. A gap may be present between each uplink and downlink portion, which is referred to as a switching gap. The switching gap length (duration) may be configurable. A switching gap duration may be fixed within a frame or flexible within a frame, and a switching gap duration may possibly change from one frame to another, or from one group of frames to another group of frames, or from one subframe to another subframe, or from one slot to another slot, or dynamically from one scheduling to another scheduling.

Cell/Carrier/Bandwidth Parts (BWPs)/Occupied Bandwidth

A device, such as a base station, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g. the center or lowest or highest frequency of the carrier. A carrier may be on licensed or unlicensed spectrum. Wireless communication with the device may also or instead occur over one or more bandwidth parts (BWPs). For example, a carrier may have one or more BWPs. More generally, wireless communication with the device may occur over spectrum. The spectrum may comprise one or more carriers and/or one or more BWPs.

A cell may include one or multiple downlink resources and optionally one or multiple uplink resources, or a cell may include one or multiple uplink resources and optionally one or multiple downlink resources, or a cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may instead or additionally include one or multiple sidelink resources, including sidelink transmitting and receiving resources.

A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

In some embodiments, a carrier may have one or more BWPs, e.g. a carrier may have a bandwidth of 20 MHz and consist of one BWP, or a carrier may have a bandwidth of 80 MHz and consist of two adjacent contiguous BWPs, etc. In other embodiments, a BWP may have one or more carriers, e.g. a BWP may have a bandwidth of 40 MHz and consists of two adjacent contiguous carriers, where each carrier has a bandwidth of 20 MHz. In some embodiments, a BWP may comprise non-contiguous spectrum resources which consists of non-contiguous multiple carriers, where the first carrier of the non-contiguous multiple carriers may be in mmW band, the second carrier may be in a low band (such as 2 GHz band), the third carrier (if it exists) may be in THz band, and the fourth carrier (if it exists) may be in visible light band. Resources in one carrier which belong to the BWP may be contiguous or non-contiguous. In some embodiments, a BWP has non-contiguous spectrum resources on one carrier.

Wireless communication may occur over an occupied bandwidth. The occupied bandwidth may be defined as the width of a frequency band such that, below the lower and above the upper frequency limits, the mean powers emitted are each equal to a specified percentage □/2 of the total mean transmitted power, for example, the value of □/2 is taken as 0.5%.

The carrier, the BWP, or the occupied bandwidth may be signaled by a network device (e.g. base station) dynamically, e.g. in physical layer control signaling such as Downlink Control Information (DCI), or semi-statically, e.g. in radio resource control (RRC) signaling or in the medium access control (MAC) layer, or be predefined based on the application scenario; or be determined by the UE as a function of other parameters that are known by the UE, or may be fixed, e.g. by a standard.

Link Adaptation

One key characteristic of wireless communication is the rapid and significant variations in the instantaneous channel conditions. For handling variations in the instantaneous radio-link quality, a typical solution is link adaptation by means of rate control, which adjusts the modulation scheme and/or the channel coding rate according to the instantaneous CSI.

Figure 5:
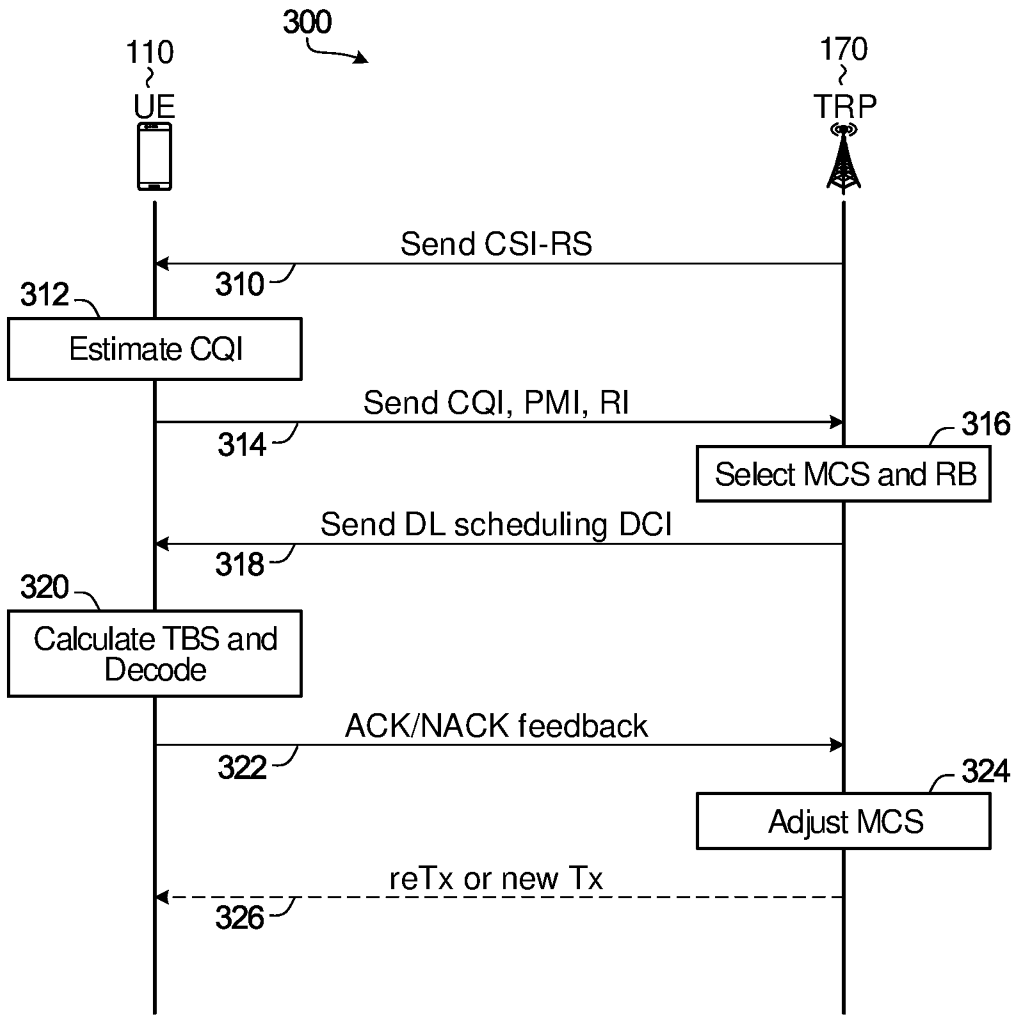
FIG. 5 illustrates an example of an existing adaptive modulation and coding (AMC) procedure.

For example, FIG. 5 is a signal flow diagram 300 of an example of a typical link adaptation procedure for downlink communication between a BS 170 and a UE 110.

The link adaptation procedure begins with BS 170 transmitting a Channel State Information Reference Signal (CSI-RS) to UE 110 at 310.

At 312, UE 110 receives the CSI-RS and estimates a Channel Quality Indicator (CQI). For example, UE 110 may estimate the CQI by determining the highest CQI index that satisfies the following: a single Physical downlink shared channel (PDSCH) transport block with a combination of modulation scheme, target code rate and transport block size corresponding to the CQI index and occupying a group of downlink physical resource blocks termed the CSI reference resource, could be received with a transport block error probability not exceeding a target Block Error Rate (BLER). For example, the target BLER may be 0.1 for normal communication or 0.00001 for Ultra Reliable Low Latency Communication (URLLC).

In some cases, UE 110 may refer to a CQI table that maps CQI indexes to modulation orders, coding rates and efficiencies in order to determine the highest CQI index that satisfies the above conditions. For example, Table 1 below depicts the 4-bit CQI Table 5.2.2.1-2 in 3GPP TS 38.214 version 16.3.0 Release 16 (Nov. 1, 2020).

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

At 314, UE 110 transmits CSI to BS 170 that includes the CQI index determined at 312. In addition to the CQI index determined at 312, the CSI transmitted at 314 also includes a Pre-coding Matrix Indicator (PMI) and Rank Indicator (RI).

At 316, BS 170, according to the received CQI index, PMI and RI, performs frequency-selective scheduling in order to schedule downlink transmission of a transport block to the UE, and chooses a MCS index corresponding to a combination of modulation order, target code rate, and time-frequency resources for transmission of the transport block.

At 318, BS 170 transmits Downlink Control Information (DCI) to the UE that indicates the selected MCS index and time-frequency resources.

In some cases, MCS indexes may be mapped to modulation orders, coding rates and efficiencies according to an MCS index table, such as the MCS index table depicted in Table 2 below, which corresponds to the MCS index Table 5.1.3.1-1 for Physical Downlink Shared Channel (PDSCH) in 3GPP TS 38.214 version 16.3.0 Release 16 (Nov. 1, 2020). UE 110 and BS 170 may each store a copy of such an MCS index table and refer to it in order to determine the modulation order and coding rate corresponding to a given MCS index.

At 320, UE 110 receives the DCI and decodes the PDSCH scheduled by the DCI, which involves calculating a Transport Block Size (TBS) based on the modulation order and coding rate corresponding to MCS index indicated by the DCI.

At 322, UE 110 transmits Acknowledgement/Negative Acknowledgement (ACK/NACK) feedback to BS 170 to indicate whether the PDSCH for the schedule downlink transmission was successfully decoded. For example, if the corresponding PDSCH is correctly decoded, UE 110 may send an Acknowledgement (ACK) indication to BS 170, otherwise, the UE may send a Negative Acknowledgement (NACK) indication to BS 170.

BS 170 receives the ACK/NACK feedback from UE 110 at 322. If it is ACK, this transmission is finished. If it is NACK, BS 170 performs open loop link adaptation (OLLA) to adjust the MCS index and time-frequency resources, as indicated at 324, and starts a retransmission procedure as indicated at 326.

TABLE 2

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

The conventional link adaptation procedure illustrated in FIG. 5 has several problems/limitations.

For example, a first problem with the conventional link adaptation procedure is related to the inherent delay between the time of data scheduling and the time at which the CSI measurement/report is generated, i.e. the CSI upon which data scheduling is based is not real-time. Due to burst interference and channel fading, the channel quality is likely to change during this delay interval, which can lead to poor scheduling performance. For example, if the real-time channel conditions between BS 170 and UE 110 improve between the time that UE 110 estimates CQI at 312 and the time that BS 170 transmits a scheduled transmission to UE 110 at 318, then the increased channel capacity that may be available due to the improved channel conditions would be wasted because the MCS selected by BS 170 at 316 for the scheduled transmission corresponds to the CQI estimated at 312. For example, if the channel conditions improve significantly enough such that a different CQI index corresponding to a higher modulation order and/or coding rate would have been estimated by the UE 110 at 312 had the improved channel conditions been present at that time, then the additional throughput that would have been possible if the higher modulation order and/or coding rate were used for the scheduled transmission would be wasted. On the other hand, if the real-time channel conditions between BS 170 and UE 110 instead degrade between the time that UE 110 estimates CQI at 312 and the time that BS 170 transmits a scheduled transmission to UE 110 at 318, then the scheduled transmission may not be successfully received by UE 110 because it utilizes a modulation order and/or coding rate that is too high for the real-time channel conditions. The failure to successfully receive the initial transmission may result in a re-transmission, as indicated at 326, that could potentially have been avoided if the initial transmission at 316 instead utilized a lower modulation order and/or coding rate reflective of the degraded channel conditions.

A second problem with the conventional link adaptation procedure is the limited number of coding rate sets that are available in current modulation and coding schemes (MCSs). For example, there are only 29 coding rate candidate values available in 5G New Radio (NR). However, in many cases the best coding rate might not be in the candidate value set. For example, the channel conditions may be such that the highest coding rate that could potentially be successfully received over the channel falls between two of the available coding rate values in the candidate value set but the lower of the two available coding rate values in the candidate value set that the "ideal" highest coding rate falls between may be used, resulting in wasted channel capacity.

A third problem with the conventional link adaptation procedure is related to the coarse granularity of frequency selective scheduling. For example, in 5G NR only one MCS value is used for a transport block (TB) for the scheduled resources, which means that subband scheduling with subband-level MCS selection (e.g., different modulation orders and/or coding rates used in different subbands) is not possible.

Artificial Intelligence (AI) and/or Machine Learning (ML)

The number of new devices in future wireless networks is expected to increase exponentially, and the functionalities of the devices are expected to become increasingly diverse. Also, many new applications and use cases are expected to emerge with more diverse quality of service demands than those of 5G applications/use cases. These will result in new key performance indications (KPIs) for future wireless networks (for example, a 6G network) that can be extremely challenging. AI technologies, such as ML technologies (e.g., deep learning), have been introduced to telecommunication applications with the goal of improving system performance and efficiency.

In addition, advances continue to be made in antenna and bandwidth capabilities, thereby allowing for possibly more and/or better communication over a wireless link. Additionally, advances continue in the field of computer architecture and computational power, e.g. with the introduction of general-purpose graphics processing units (GP-GPUs). Future generations of communication devices may have more computational and/or communication ability than previous generations, which may allow for the adoption of AI for implementing air interface components. Future generations of networks may also have access to more accurate and/or new information (compared to previous networks) that may form the basis of inputs to AI models, e.g.: the physical speed/velocity at which a device is moving, a link budget of the device, the channel conditions of the device, one or more device capabilities and/or a service type that is to be supported, sensing information, and/or positioning information, etc. To obtain sensing information, a TRP may transmit a signal to target object (e.g. a suspected UE), and based on the reflection of the signal the TRP or another network device computes the angle (for beamforming for the device), the distance of the device from the TRP, and/or doppler shifting information. Positioning information is sometimes referred to as localization, and it may be obtained in a variety of ways, e.g. a positioning report from a UE (such as a report of the UE's GPS coordinates), use of positioning reference signals (PRS), using the sensing described above, tracking and/or predicting the position of the device, etc.

AI technologies (which encompass ML technologies) may be applied in communication, including AI-based communication in the physical layer and/or AI-based communication in the MAC layer. For the physical layer, the AI communication may aim to optimize component design and/or improve the algorithm performance. For example, AI may be applied in relation to the implementation of: channel coding, channel modelling, channel estimation, channel decoding, modulation, demodulation, MIMO, waveform, multiple access, physical layer element parameter optimization and update, beam forming, tracking, sensing, and/or positioning, etc. For the MAC layer, the AI communication may aim to utilize the AI capability for learning, prediction, and/or making a decision to solve a complicated optimization problem with possible better strategy and/or optimal solution, e.g. to optimize the functionality in the MAC layer. For example, AI may be applied to implement: intelligent TRP management, intelligent beam management, intelligent channel resource allocation, intelligent power control, intelligent spectrum utilization, intelligent MCS, intelligent HARQ strategy, and/or intelligent transmission/reception mode adaption, etc.

In some embodiments, an AI architecture may involve multiple nodes. The multiple nodes may possibly be organized in one of two modes, i.e., centralized and distributed, both of which may be deployed in an access network, a core network, or an edge computing system or third party network. A centralized training and computing architecture is restricted by possibly large communication overhead and strict user data privacy. A distributed training and computing architecture may comprise several frameworks, e.g., distributed machine learning and federated learning. In some embodiments, an AI architecture may comprise an intelligent controller which can perform as a single agent or a multi-agent, based on joint optimization or individual optimization. New protocols and signaling mechanisms are desired so that the corresponding interface link can be personalized with customized parameters to meet particular requirements while minimizing signaling overhead and maximizing the whole system spectrum efficiency by personalized AI technologies.

In some embodiments herein, new protocols and signaling mechanisms are provided for operating within and switching between different modes of operation for link adaptation, including between training and normal operation modes, and for measurement and feedback to accommodate the different possible measurements and information that may need to be fed back, depending upon the implementation.

AI-Enabled Link Adaptation

The present disclosure describes examples of link adaptation procedures using AI/ML to provide device-specific communication link optimization in a manner that avoids or at least mitigates one or more of the foregoing problems with conventional link adaptation procedures. For example, as discussed in further detail below, in some embodiments described herein a pair of communicating devices each have a ML module that is trained to predict the same optimal real-time MCS based on current channel state information at the respective device. In such embodiments, overhead associated with feedback from the receiving device to the transmitting device for MCS selection may be greatly reduced compared to conventional link adaptation procedures because, once the ML modules have been trained, the MCS selection by the ML modules can be done without requiring the ongoing feedback of channel state information, such as CQI, PMI, RI, Reference Signal Received Power, SINR, etc., that may be used for MCS selection in conventional link adaptation procedures. In other embodiments described herein a pair of communicating devices each have a ML module that is trained to predict the same optimal real-time MCS based on the allocated RBs and channel state information (CQI, PMI, RI, RSRP, SINR, etc.) so that the receiving device (e.g., a UE) can accurately predict the MCS used by the transmitting device (e.g., a TRP) for a scheduled transmission based on the allocated RBs on which the transmission has been scheduled and the current channel state information at the receiving device. As discussed in further detail below, in such embodiments the ML module that is used for MCS prediction at each device may be trained to predict MCS parameters that include a TB-level modulation order and a TB-level coding rate, subband-level modulation order(s) and a TB-level coding rate, or subband-level modulation order(s) and subband-level coding rate(s). In some cases, a device may be dependent on centralized learning/training (e.g., all learning is done centrally in the network, such as at a base station or TRP). In other cases, learning/training may be based on federated learning, which is a machine learning technique that trains an algorithm across multiple decentralized edge devices or servers holding local data samples, without exchanging their data samples. In still other cases, learning/training may also or instead involve device cooperative learning.

Figure 6:
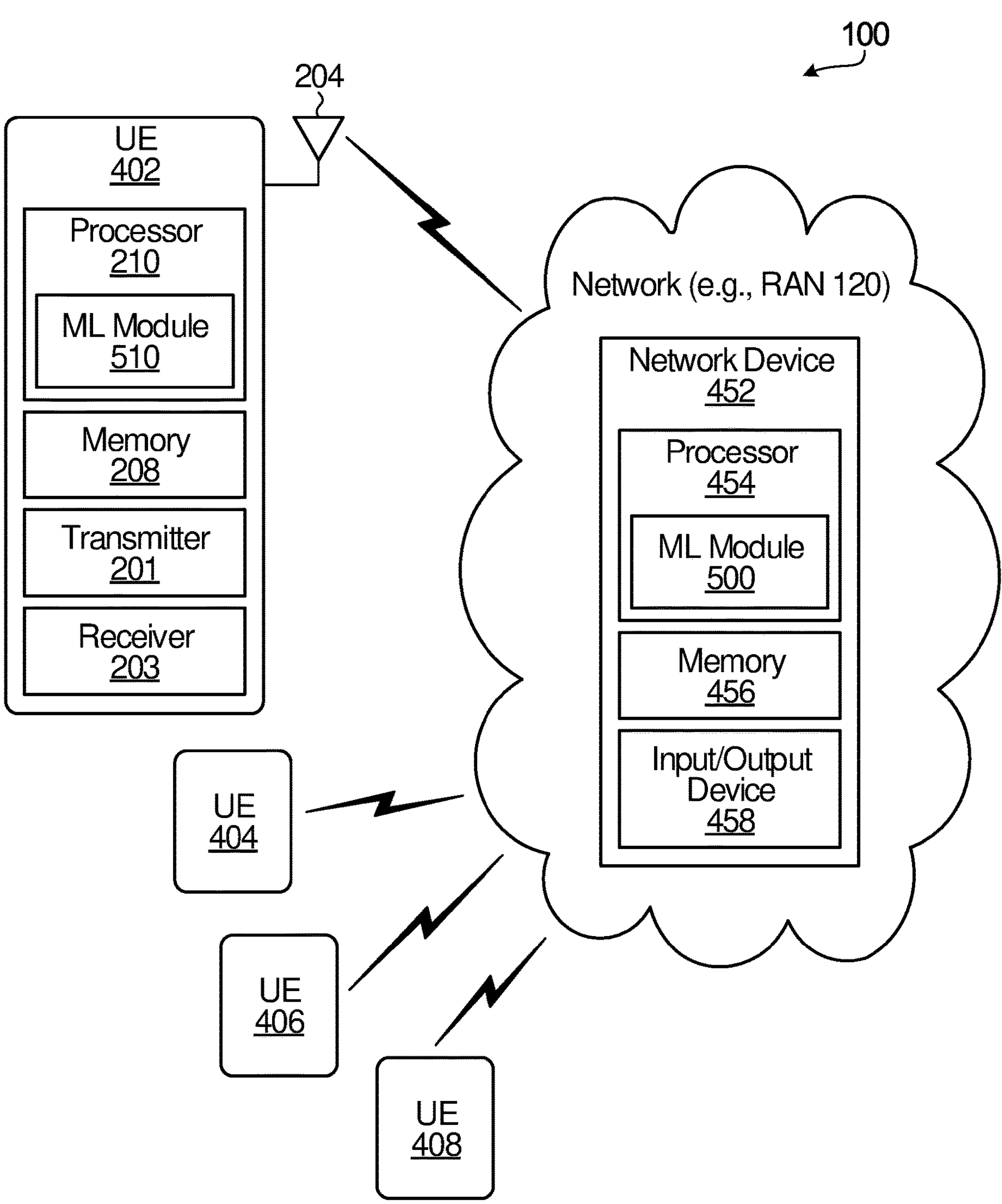
FIG. 6 illustrates four EDs communicating with a network device in a communication system, according to one embodiment.

Referring again to FIGS. 1 and 2, embodiments of the present disclosure may be used to implement link adaptation between pairs of communicating devices in the communication system 100. For example, FIG. 6 illustrates four EDs communicating with a network device 452 in the communication system 100, according to one embodiment. The four EDs are each illustrated as a respective different UE, and will hereafter be referred to as UEs 402, 404, 406, and 408. However, the EDs do not necessarily need to be UEs.

The network device 452 is part of a network (e.g. a radio access network 120). The network device 452 may be deployed in an access network, a core network, or an edge computing system or third-party network, depending upon the implementation. The network device 452 might be (or be part of) a T-TRP or a server. In one example, the network device 452 can be (or be implemented within) T-TRP 170 or NT-TRP 172. In another example, the network device 452 can be a T-TRP controller and/or a NT-TRP controller which can manage T-TRP 170 or NT-TRP 172. In some embodiments, the components of the network device 452 might be distributed. The UEs 402, 404, 406, and 408 might directly communicate with the network device 452, e.g. if the network device 452 is part of a T-TRP serving the UEs 402, 404, 406, and 408. Alternatively, the UEs 402, 404, 406, and 408 might communicate with the network device 352 via one or more intermediary components, e.g. via a T-TRP and/or via a NT-TRP, etc. For example, the network device 452 may send and/or receive information (e.g. control signaling, data, training sequences, etc.) to/from one or more of the UEs 402, 404, 406, and 408 via a backhaul link and wireless channel interposed between the network device 452 and the UEs 402, 404, 406, and 408.

Each UE 402, 404, 406, and 408 includes a respective processor 210, memory 208, transmitter 201, receiver 203, and one or more antennas 204 (or alternatively panels), as described above. Only the processor 210, memory 208, transmitter 201, receiver 203, and antenna 204 for UE 402 are illustrated for simplicity, but the other UEs 404, 406, and 408 also include the same respective components.

For each UE 402, 404, 406, and 408, the communications link between that UE and a respective TRP in the network is an air interface. The air interface generally includes a number of components and associated parameters that collectively specify how a transmission is to be sent and/or received over the wireless medium.

The processor 210 of a UE in FIG. 6 implements one or more air interface components on the UE-side. The air interface components configure and/or implement transmission and/or reception over the air interface. Examples of air interface components are described herein. An air interface component might be in the physical layer, e.g. a channel encoder (or decoder) implementing the coding component of the air interface for the UE, and/or a modulator (or demodulator) implementing the modulation component of the air interface for the UE, and/or a waveform generator implementing the waveform component of the air interface for the UE, etc. An air interface component might be in or part of a higher layer, such as the MAC layer, e.g. a module that implements channel prediction/tracking, and/or a module that implements a retransmission protocol (e.g. that implements the HARQ protocol component of the air interface for the UE), etc. The processor 210 also directly performs (or controls the UE to perform) the UE-side operations described herein, e.g., implementing an AI-enabled link adaptation protocol and associated training (e.g., performing channel state measurements, transmitting feedback based on the measurement, etc.).

The network device 452 includes a processor 454, a memory 456, and an input/output device 458. The processor 454 implements or instructs other network devices (e.g. T-TRPs) to implement one or more of the air interface components on the network side. An air interface component may be implemented differently on the network-side for one UE compared to another UE. The processor 454 directly performs (or controls the network components to perform) the network-side operations described herein, e.g., implementing an AI-enabled link adaptation protocol and associated training.

The processor 454 may be implemented by the same or different one or more processors that are configured to execute instructions stored in a memory (e.g. in memory 456). Alternatively, some or all of the processor 454 may be implemented using dedicated circuitry, such as a programmed FPGA, a GPU, or an ASIC. The memory 456 may be implemented by volatile and/or non-volatile storage. Any suitable type of memory may be used, such as RAM, ROM, hard disk, optical disc, on-processor cache, and the like.

The input/output device 458 permits interaction with other devices by receiving (inputting) and transmitting (outputting) information. In some embodiments, the input/output device 458 may be implemented by a transmitter and/or a receiver (or a transceiver), and/or one or more interfaces (such as a wired interface, e.g. to an internal network or to the internet, etc). In some implementations, the input/output device 458 may be implemented by a network interface, which may possibly be implemented as a network interface card (NIC), and/or a computer port (e.g. a physical outlet to which a plug or cable connects), and/or a network socket, etc., depending upon the implementation.

The network device 452 and the UE 402 have the ability to implement AI-enabled link adaptation for communication between the network device 452 and the UE 402. In particular, in the embodiment in FIG. 6 the network device 452 and the UE 402 include ML modules 410 and 460, respectively. The ML module 410 is implemented by processor 210 of UE 402 and the ML module 460 is implemented by processor 454 of network device 452 and therefore the ML module 410 is shown as being within processor 210 and the ML module 460 is shown as being with processor 454 in FIG. 6. The ML modules 410 and 460 execute one or more AI/ML algorithms to perform link adaptation to optimize communication links between the network and the UE 402.

The ML modules 410 and 460 may be implemented using an AI model. The term AI model may refer to a computer algorithm that is configured to accept defined input data and output defined inference data, in which parameters (e.g., weights) of the algorithm can be updated and optimized through training (e.g., using a training dataset, or using real-life collected data). An AI model may be implemented using one or more neural networks (e.g., including deep neural networks (DNN), recurrent neural networks (RNN), convolutional neural networks (CNN), and combinations thereof) and using various neural network architectures (e.g., autoencoders, generative adversarial networks, etc.). Various techniques may be used to train the AI model, in order to update and optimize its parameters. For example, backpropagation is a common technique for training a DNN, in which a loss function is calculated between the inference data generated by the DNN and some target output (e.g., ground-truth data). A gradient of the loss function is calculated with respect to the parameters of the DNN, and the calculated gradient is used (e.g., using a gradient descent algorithm) to update the parameters with the goal of minimizing the loss function.

Figure 7:
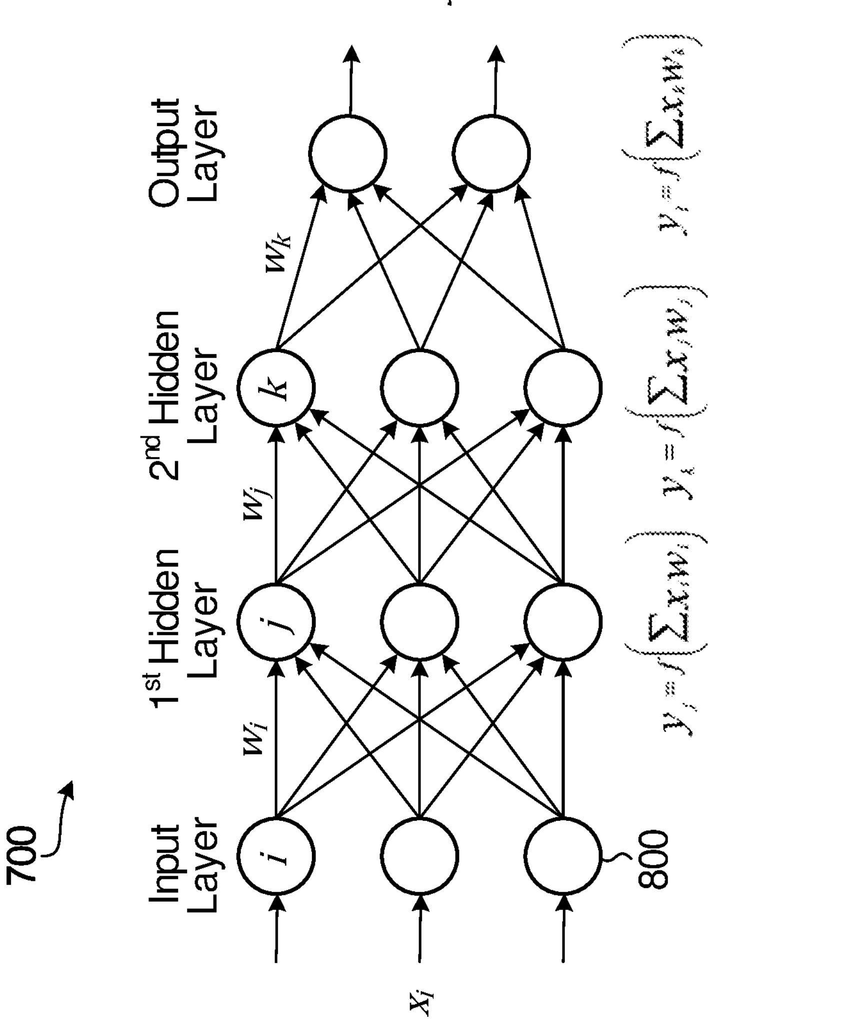
FIG. 7 illustrates and example of a neural network with multiple layers of neurons, according to one embodiment.
Figure 8:
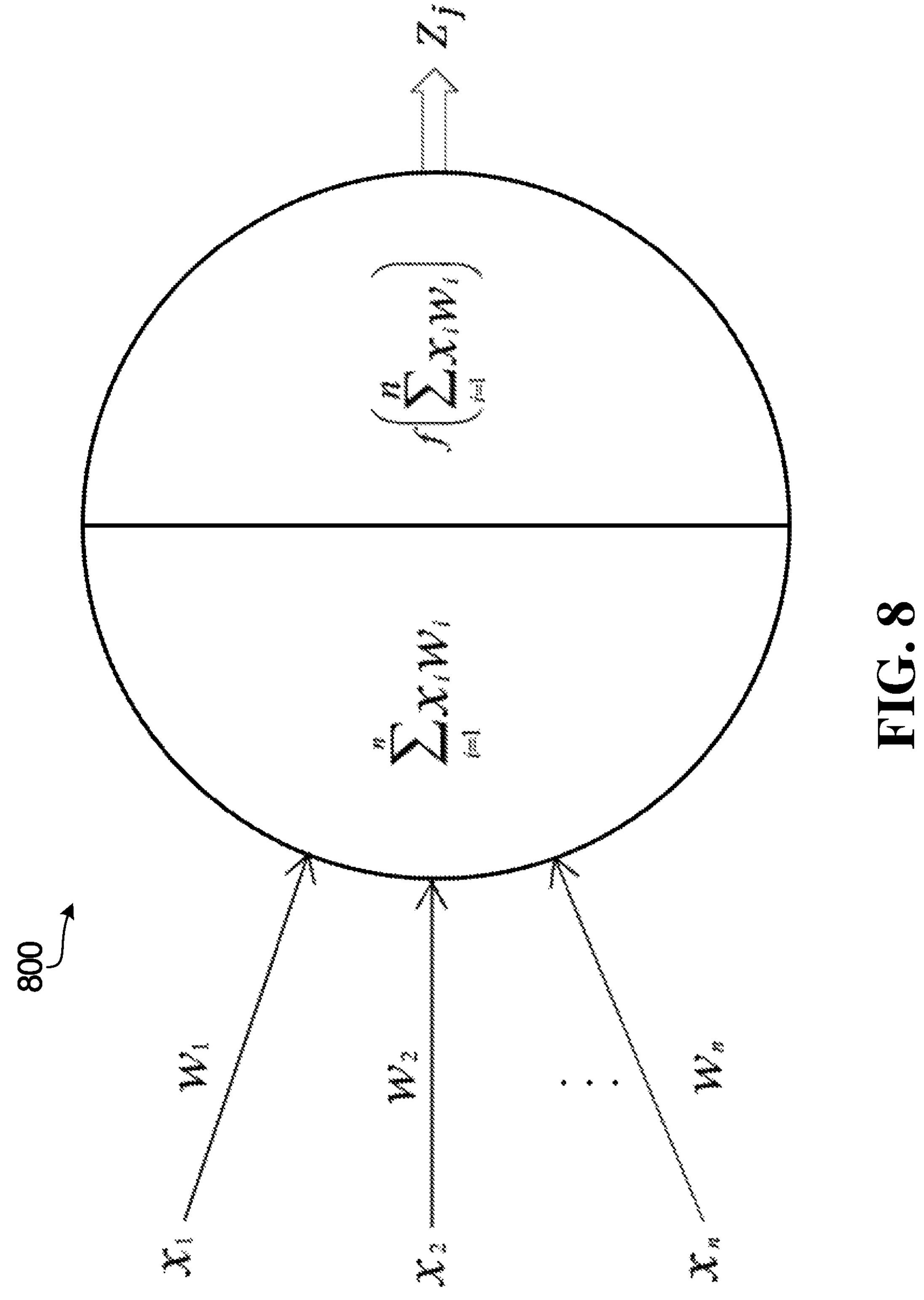
FIG. 8 illustrates an example of a neuron that may be used as a building block for a neural network, according to one embodiment.

In some embodiments, an AI model encompasses neural networks, which are used in machine learning. A neural network is composed of a plurality of computational units (which may also be referred to as neurons), which are arranged in one or more layers. The process of receiving an input at an input layer and generating an output at an output layer may be referred to as forward propagation. In forward propagation, each layer receives an input (which may have any suitable data format, such as vector, matrix, or multidimensional array) and performs computations to generate an output (which may have different dimensions than the input). The computations performed by a layer typically involves applying (e.g., multiplying) the input by a set of weights (also referred to as coefficients). With the exception of the first layer of the neural network (i.e., the input layer), the input to each layer is the output of a previous layer. A neural network may include one or more layers between the first layer (i.e., input layer) and the last layer (i.e., output layer), which may be referred to as inner layers or hidden layers. For example, FIG. 7 depicts an example of a neural network 700 that includes an input layer, an output layer and two hidden layers. In this example, it can be seen that the output of each of the three neurons in the input layer of the neural network 700 is included in the input vector to each of the three neurons in the first hidden layer. Similarly, the output of each of the three neurons of the first hidden layer is included in an input vector to each of the three neurons in the second hidden layer and the output of each of the three neurons of the second hidden layer is included in an input vector to each of the two neurons in the output layer. As noted above, the fundamental computation unit in a neural network is the neuron, as shown at 800 in FIG. 7. FIG. 8 illustrates an example of a neuron 800 that may be used as a building block for the neural network 700. As shown in FIG. 8, in this example the neuron 800 takes a vector x as an input and performs a dot-product with an associated vector of weights w. The final output z of the neuron is the result of an activation function ƒ( ) on the dot product. Various neural networks may be designed with various architectures (e.g., various numbers of layers, with various functions being performed by each layer).

A neural network is trained to optimize the parameters (e.g., weights) of the neural network. This optimization is performed in an automated manner and may be referred to as machine learning. Training of a neural network involves forward propagating an input data sample to generate an output value (also referred to as a predicted output value or inferred output value), and comparing the generated output value with a known or desired target value (e.g., a ground-truth value). A loss function is defined to quantitatively represent the difference between the generated output value and the target value, and the goal of training the neural network is to minimize the loss function. Backpropagation is an algorithm for training a neural network. Backpropagation is used to adjust (also referred to as update) a value of a parameter (e.g., a weight) in the neural network, so that the computed loss function becomes smaller. Backpropagation involves computing a gradient of the loss function with respect to the parameters to be optimized, and a gradient algorithm (e.g., gradient descent) is used to update the parameters to reduce the loss function. Backpropagation is performed iteratively, so that the loss function is converged or minimized over a number of iterations. After a training condition is satisfied (e.g., the loss function has converged, or a predefined number of training iterations have been performed), the neural network is considered to be trained. The trained neural network may be deployed (or executed) to generate inferred output data from input data. In some embodiments, training of a neural network may be ongoing even after a neural network has been deployed, such that the parameters of the neural network may be repeatedly updated with up-to-date training data.

Referring again to FIG. 6, in some embodiments the UE 402 and network device 452 may exchange information for the purposes of training. The information exchanged between the UE 402 and the network device 452 is implementation specific, and it might not have a meaning understandable to a human (e.g. it might be intermediary data produced during execution of a ML algorithm). It might also or instead be that the information exchanged is not predefined by a standard, e.g. bits may be exchanged, but the bits might not be associated with a predefined meaning. In some embodiments, the network device 452 may provide or indicate, to the UE 402, one or more parameters to be used in the ML module 410 implemented at the UE 402. As one example, the network device 452 may send or indicate updated neural network weights to be implemented in a neural network executed by the ML module 410 on the UE-side, in order to try to optimize one or more aspects of modulation and/or coding used for communication between the UE 402 and a T-TRP or NT-TRP.

In some embodiments, the UE 402 may implement AI itself in relation to link adaptation, e.g. perform learning, whereas in other embodiments the UE 402 may not perform learning itself but may be able to operate in conjunction with an AI implementation on the network side, e.g. by receiving configurations from the network for an AI model (such as a neural network or other ML algorithm) implemented by the ML module 410, and/or by assisting other devices (such as a network device or other AI capable UE) to train an AI model (such as a neural network or other ML algorithm) by providing requested measurement results or observations. For example, in some embodiments, UE 402 itself may not implement learning or training, but the UE 402 may receive trained configuration information for an ML model determined by the network device 452 and execute the model.

Although the example in FIG. 6 assumes AI/ML capability on the network side, it might be the case that the network does not itself perform training/learning, and instead a UE may perform learning/training itself, possibly with dedicated training signals sent from the network. In other embodiments, end-to-end (E2E) learning may be implemented by the UE and the network device 452, e.g. to jointly optimize on the transmission and receive side.

Using AI, e.g. by implementing an AI model as described above, link adaptation may be AI-enabled. In some embodiments, the AI is used to optimize the modulation and/or coding used for communication between the network and devices on a device-specific basis in a manner that avoids or at least mitigates the problems associated with conventional link adaptation procedures that were discussed earlier. Some examples of possible AI/ML training processes and over the air information exchange procedures between devices during training phases and normal operation phases to facilitate AI-enabled link adaptation in accordance with embodiments of the present disclosure are described below.

Figure 9:
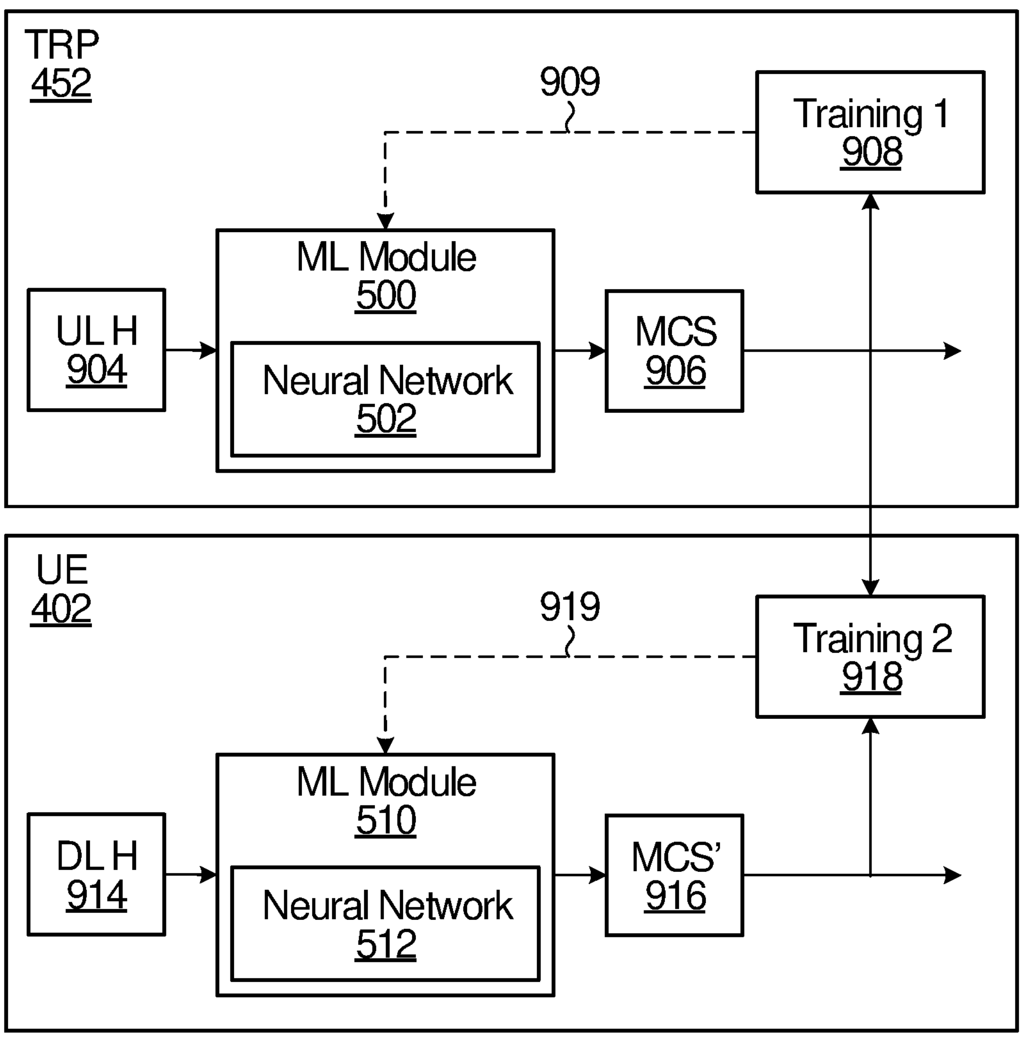
FIG. 9 illustrates a two-step joint training phase for machine learning modules of an ED and a network device in order to facilitate link adaptation between the ED and the network device, according to one embodiment.

FIG. 9 illustrates an example of a two-step joint training phase for the ML modules of an ED and a network device in order to facilitate link adaptation for downlink communication between the network device and the ED, according to one embodiment. In this example, the ED and network device are shown as being the UE 402 and the network device 452 of FIG. 6. In addition, the network device is shown as being a TRP 452. To simplify the drawing the ML module 500 of the TRP 452 and the ML module 510 of the UE 402 are shown in FIG. 9, but the other components of the TRP 452 and the UE 402 are omitted from the drawing.

In this embodiment, AI/ML is implemented on the network side by the ML module 500 and on the UE side by the ML module 510. As shown in FIG. 9, the ML modules 500 and 510 may implement neural networks 502 and 512, respectively. In this embodiment, once the ML modules 500 and 510 have been trained, the TRP 452 uses the trained ML module 500 to predict, based on using uplink channel state information (UL H 904 in FIG. 9) as an input to the trained ML module 500, optimal MCS parameters (MCS 906 in FIG. 9) that indicate the modulation order and/or coding rate for scheduled RBs for a downlink transmission to the UE 402 at a given time. For example, if there are two candidate scheduled RB sets over which the TRP 452 could potentially transmit a downlink transmission to the UE 402, e.g. candidate scheduled RB set 1=RB 0~4 and candidate scheduled RB set 2=RB 5~9, the trained ML module 500 at the TRP 452 may be used to predict optimal MCS for each candidate scheduled RB set, e.g. MCS1 for RB0~4 AND MCS2 for RB 5~9. The TRP 452 may then select the candidate scheduled RB set with the better link performance to use for the downlink transmission, e.g. RB 0~4 if MCS1>MCS2 or RB 5~9 if MCS2>MCS1. The TRP 452 may then send scheduling information to the UE 402 (e.g., via DCI) to indicate which RBs have been allocated for a scheduled downlink transmission to the UE 402. At the UE side, UE 402 uses the trained ML module 510 to predict optimal MCS for each candidate scheduled RB set, and based on the RB allocation information from the TRP 452, the UE 452 can infer the optimal MCS the TRP 452 has selected for the scheduled RBs.

The uplink channel state information UL H 904 may include any information that characterizes an uplink communication channel between the UE 402 and the TRP 452. For example, the uplink channel state information UL H 904 might include information estimated based on an uplink reference signal (UL RS), such as an uplink Sounding Reference Signal (SRS), received by the TRP 452 from the UE 402, which may or may not include the impacts of interference. On the UE side, once the ML modules 500 and 510 have been trained, the UE 402 uses the trained ML module 510 to predict, based on using downlink channel state information (DL H 914 in FIG. 9) as an input to the trained ML module 510, MCS parameters (MCS'916 in FIG. 9) that should match the optimal MCS parameters MCS 906 predicted by the TRP 452 for the scheduled RBs at the given time. The downlink channel state information DL H 914 may include any information that characterizes a downlink communication channel between the TRP 452 and the UE 402. For example, the downlink channel state information DL H 914 might include information estimated based on a downlink reference signal (DL RS), such as a channel state information reference signal (CSI-RS), received by the UE 402 from the TRP 452, which may or may not include the impacts of interference. Precoding of the DL RS may be indicated to the UE or may be predefined in some embodiments.

In this embodiment, the ML module 500 of the TRP 452 and the ML module 510 of the UE 402 are trained in a two-step joint training process. The first step of the two-step joint training process is indicated at 908 in FIG. 9. In the first step 908 of the two-step joint training process, the ML module 500 of the TRP 452 is trained using uplink channel state information UL H 904 as an ML module input and the one or more modulation and coding scheme parameters MCS 906 as an ML module output to satisfy a training target. The one or more modulation and coding scheme parameters MCS 906 might include a predicted modulation order, a predicted coding rate, or both. During the first training step, configuration parameters of the ML module 500, such as the neural network weights to be implemented in the neural network 502 executed by the ML module 500, are updated as part of the training/learning process, which is indicated at 909 in FIG. 9. The training target used to train the ML module 500 might be to maximize throughput and/or optimize some other performance parameter/metric associated with communication between devices such as minimizing latency, maximizing reliability etc. For example, the training of the ML module 500 to maximize throughput may be done using reinforcement learning to maximize MCS/(1+IBLER) or MCS*(1−IBLER), where MCS is the modulation and coding scheme predicted by the ML module 500 and IBLER is the Initial-transmission Block Error Rate. For example, during the first step of the training phase the input of the ML module 500 may be the UL channel state information UL H 904 at slot n1. The UL channel state information UL H 904 might be obtained by SRS measurement at slot n1, for example. In this training scenario, the output MCS 906 of the ML module 500 is the optimal MCS or modulation order or coding rate for scheduled RBs at slot n1+m (where m is an integer, and m 1) to satisfy the training target, which in this example might be to maximize throughput, as described above. Once the ML module 500 of the TRP 452 has been trained, the output MCS 906 of the ML module 500 for scheduled RBs at slot n1+m is provided to the UE 402 as labeled data for use in training the ML module 510 of the UE 402 in the second step of the two-step joint training process.

The second step of the two-step joint training process is indicated at 918 in FIG. 9. In the second step 918 of the two-step joint training process, the ML module 510 of the UE 402 is trained using downlink channel state information DL H 914 as an ML module input and the predicted one or more modulation and coding scheme parameters MCS'916 as an ML module output to satisfy a training target. During the second training step, configuration parameters of the ML module 510, such as the neural network weights to be implemented in the neural network 512 executed by the ML module 510, are updated as part of the training/learning process, which is indicated at 919 in FIG. 9. The training target used to train the ML module 510 is to have the predicted one or more modulation and coding scheme parameters MCS'916 of the ML module output of the ML module 510 of the UE 402 match the predicted one or more modulation and coding scheme parameters MCS 906 of the ML module output of the ML module 500 of the TRP 452. The training of the ML module 510 may be done via supervised training using the predicted one or more modulation and coding scheme parameters MCS 906 as labeled data to train the ML module 510 so that the ML module output MCS'916 of the ML module 510 matches the ML module output MCS 906 of the ML module 500. For example, during the second step of the training phase, the input of the ML module 510 may be the DL channel state information DL H 914 at slot n2 and the output MCS'916 of ML module 510 is the optimal MCS or modulation order or coding rate for scheduled RBs at slot n1+m. For TDD, n1 and n2 are different UL and DL time slots, e.g., n2 may be the DL slot after UL slot n1. The DL channel state information DL H 914 might be obtained by CSI-SRS measurement at slot n2, for example. In this training scenario, the UE 402, via supervised learning using the ML module output MCS 906 for slot n1+m as labeled data, calculates the loss between MCS 906 for slot n1+m and MCS'916 for slot n2, and updates the configuration of the ML module 510 (e.g., updates the neural network weights implemented in the neural network 512), until the loss is zero, i.e. until the values of MCS 906 and MCS'916 match. For example, in some embodiments the loss may be calculated using a mean square error (MSE) calculation that satisfies the following equation:

$$MSE = \frac{1}{N}\sum_{i=1}^{N}(MCS' - MCS)^2$$

where MCS' is the MCS'916 for slot n2, MCS is the MCS 906 for slot n1+m, and N is the number of candidate scheduled RB groups (e.g., if there are two candidate scheduled RB groups, such as RBs 0~4 and RBs 5~9, then N=2).

After the above training procedure has completed successfully, the optimal MCS output at the TRP 452 and the UE 452 are aligned, i.e. at slot n1+m, the optimal MCS output MCS 906 of the ML module 500 of the TRP 452 and the MCS output MCS'916 of the ML module 510 of the UE 402 are the same. Therefore, for scheduled RBs for downlink transmission to the UE 402 at slot n1+m, the TRP 452 does not need to send an MCS indication to the UE 402, because the UE 402 can infer the MCS using the DL channel state information at slot n2 as an input to ML module 510.

For Frequency Division Duplexing (FDD), the UL channel and the DL channel may have limited reciprocity, which can lead to performance loss of the two-step training process depicted in FIG. 9 which utilizes UL channel information as an ML module input at the TRP 452 and DL channel information as an ML module input at the UE 402 and therefore tends to provide better performance when there is high reciprocity between UL and DL channels. For FDD communication, or other scenarios in which there may be limited reciprocity between the UL and DL channels used for communication between two devices, the same channel information (e.g., DL channel information) may be used as the input of ML modules at both devices. For example, the DL channel information measured by the UE 402 and used as an input to the ML module 510 at the UE may be transmitted to the TRP 452 to be used as an input to the ML module 500 at the TRP 452.

Figure 10:
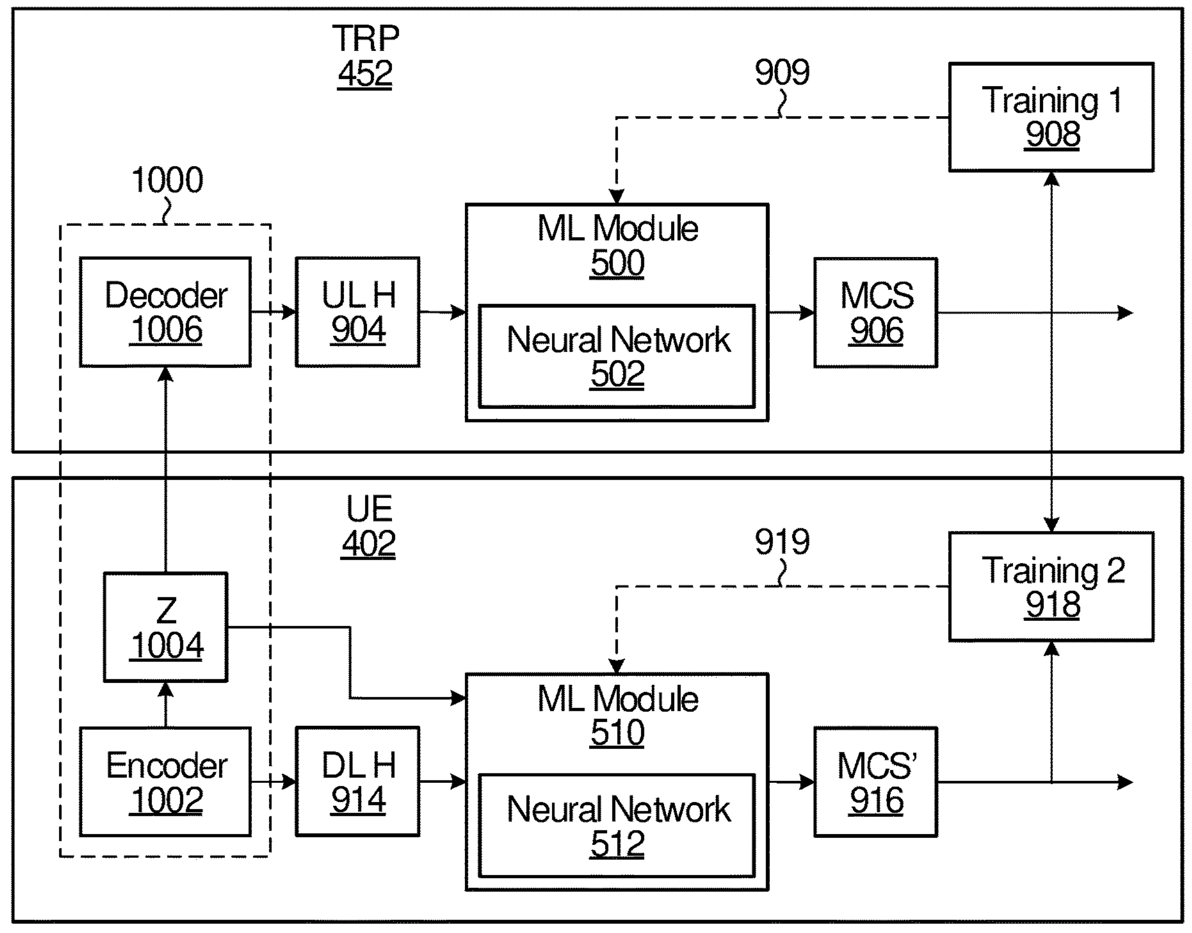
FIG. 10 illustrates a two-step joint training phase for machine learning modules of an ED and a network device in order to facilitate link adaptation between the ED and the network device, according to another embodiment.

For example, FIG. 10 illustrates another example of a two-step joint training phase for the ML modules 500 and 510 of the TRP 452 and UE 402 to facilitate link adaptation between the devices, but in this example the DL channel state information DL H 914, or an encoded version thereof, is transmitted to the TRP 452 to use as an input to the ML module 500 of the TRP 452. In particular, in this example in order to reduce the overhead associated with making the DL channel state information available to TRP 452, the DL channel state information DL H 914 is compressed using an encoder 1002 to generate compressed DL channel information z, which is indicated at 1004 in FIG. 10. The compressed DL channel information z 1004 is sent to TRP 452, which includes a decoder 1006 configured to decode the compressed DL channel information z 1004 to obtain reconstructed DL channel information H'905, which is used as an input of ML module 500. As shown in FIG. 10, the DL channel information H 914 or the compressed DL channel information z 1004 may be used as an input of the ML module 510 at the UE 402.

Two-step training of the ML modules 500 and 510 in the example depicted in FIG. 10 proceeds similarly to the example shown in FIG. 9 once the TRP 452 has received the compressed DL channel information z 1004 from the UE 402. For example, at slot n2, the UE 402 obtains the DL channel information H 914 (e.g., by measuring CSI-RS received from TRP 452), which is inputted to the encoder 1002 to get the compressed DL channel information z 1004. The UE 402 sends the compressed DL channel information z 1004 to the TRP 452, where it is inputted to the decoder 1006 to get the reconstructed DL channel information H'905. Then the TRP 452 uses the reconstructed DL channel information H'905 as the input of ML module 500 and performs training of the ML module 500 similar to the training performed in the first step of the two-step training process shown in FIG. 9. In some embodiments, rather than using the reconstructed DL channel information H'905 as the input of ML module 500, the TRP 452 may instead directly use the compressed DL channel information z 1004 as an input to the ML module 500. In such embodiments, the functionality of the decoder 1006 may be implemented by ML module 500, for example. As in the previous example shown in FIG. 9, once the ML module 500 of the TRP 452 has been trained, the output MCS 906 of the ML module 500 for scheduled RBs at slot n2+m is provided to the UE 402 as labeled data for use in training the ML module 510 of the UE 402 in the second step of the two-step joint training process. In the second step of training, the UE uses the DL channel information H 914 or the compressed DL channel information z 1004 as the input of ML module 510, and the ML module 510 is trained similarly to the second step of training described above with reference to FIG. 9. For example, the ML module 510 may be trained, using the optimal MCS output MCS 906 of the ML module 500 of the TRP 452 as labelled data so that the MCS output MCS'916 of the ML module 510 matches the optimal MCS output MCS 906 of the ML module 500 of the TRP 452 at slot n2+m.

In some embodiments, the encoder 1002 and decoder 1006 shown in FIG. 10 may be implemented with a neural network-based autoencoder (AE) structure that includes encoder layers, a latent space and decoder layers, as described below.

An AE is a type of artificial neural network with a particular architecture that is suited for applications in which it is desirable to reproduce an input vector x at an output vector $\hat{x}$ with maximal accuracy. The caveat is that the AE has a hidden layer, called a latent space z, with a dimensionality less than that of the input layer. The latent space can be thought of as a compressed representation, and the layers before and after the latent space are the encoder and decoder, respectively. It is generally desirable to minimize the dimensionality of the latent space while maintaining the accuracy of the decoder.

Figure 11:
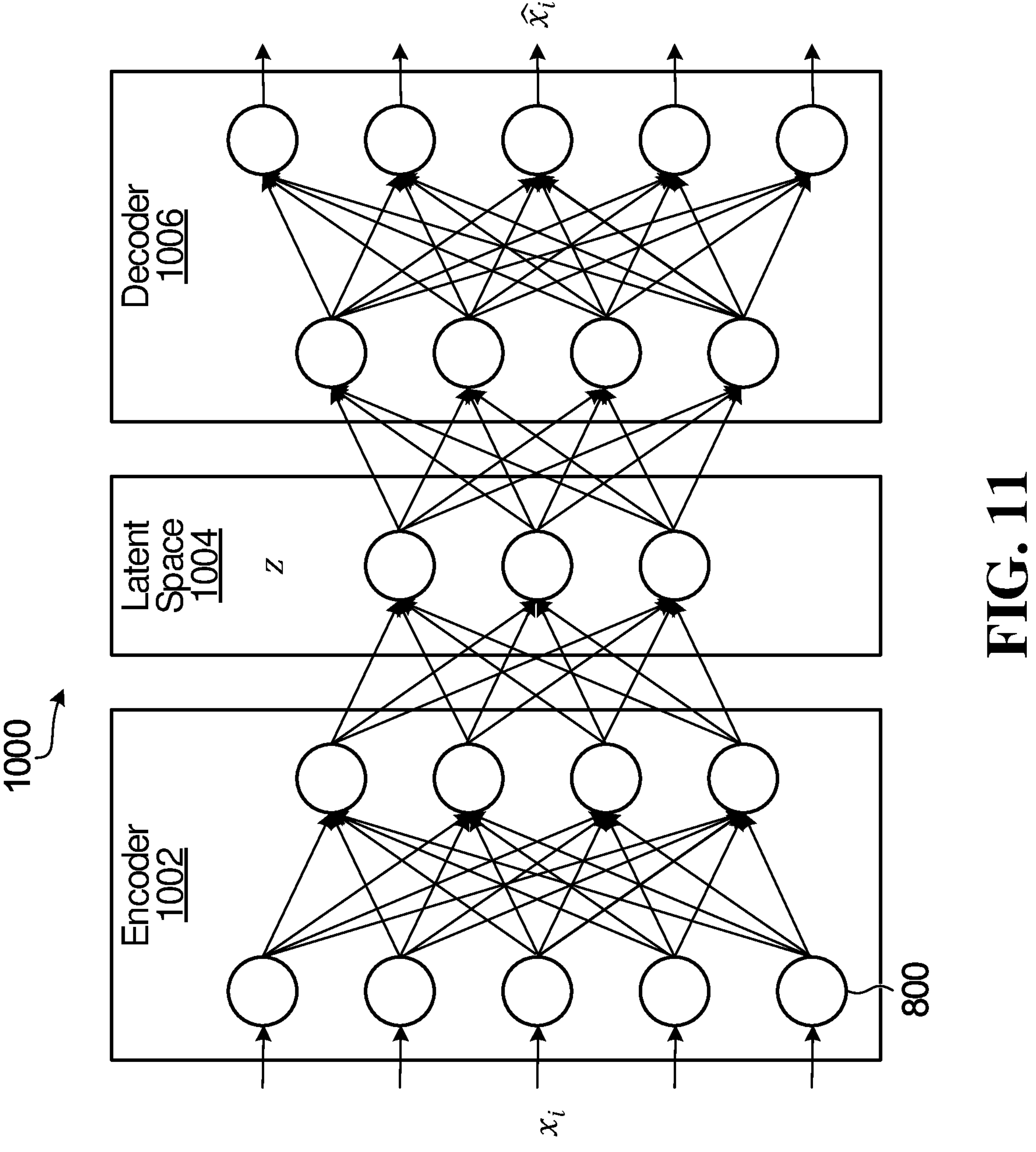
FIG. 11 illustrates an example of a neural network-based autoencoder (AE) structure that may be utilized for communication of channel state information from the ED to the network device of FIG. 10.

FIG. 11 illustrates an example of a neural network-based AE structure 1000 that might be used to implement the functionality of the encoder 1002 and decoder 1006 shown in FIG. 10. The AE structure 1000 includes an encoder 1002, a latent space z 1004 and a decoder 1006. In this example, the encoder 1002 input has a dimensionality of 5, which is reduced to 3 at the latent space z 1004 and expanded again to 5 by the decoder 1006. Although the encoder 1002 and decoder 1006 are shown as each including two layers in this example, more generally the encoder and decoder of an AE structure may include one or more layers. The layers of AE structure may be implemented with neurons 800 similar to those discussed above with reference to FIG. 8, for example. It is noted that if the functionality of the encoder 1002 and decoder 1006 shown in FIG. 10 is implemented with a neural network-based AE structure, then the UE 402 and TRP 452 each include a "cascade" of AI models. For example, if the decoder 1006 of FIG. 10 is implemented with a neural network-based structure similar to the decoder 1006 of the AE structure 1000 of FIG. 11, then neural network structure of the decoder (used for channel state information decompression/reconstruction) followed by the neural network 502 of the ML module 500 (used for MCS prediction) can be viewed as a "cascade" of AI models.

Link adaptation procedures utilizing ML modules trained in accordance with the two-step training processes described above with reference to the example embodiments shown in FIGS. 9 and 10 provide potential benefits/advantages over conventional link adaptation procedures such as the conventional link adaptation procedure shown in FIG. 5. For example, link adaptation procedures utilizing such trained ML modules allow pairs of devices to obtain optimal MCS parameters for communication with one another based on DL and/or UL channel information with minimal or reduced air-interface overhead.

Figure 12:
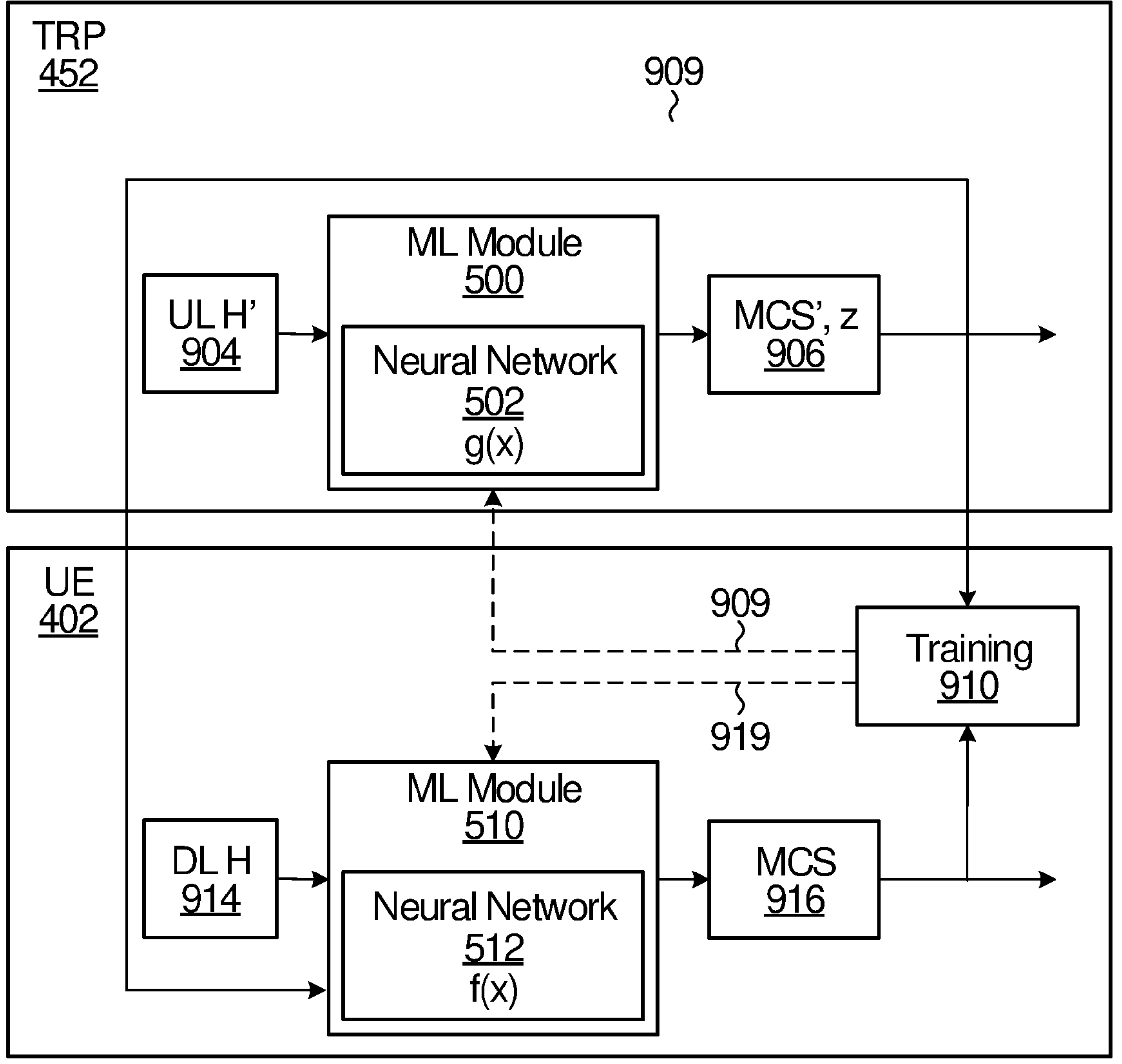
FIG. 12 illustrates a one-step joint training phase for machine learning modules of an ED and a network device in order to facilitate link adaptation between the ED and the network device, according to one embodiment.

FIG. 12 illustrates an example of a one-step joint training phase for machine learning modules of an ED and a network device in order to facilitate link adaptation between the ED and the network device, according to one embodiment. As in the two-step joint training phase examples shown in FIGS. 9 and 10, in the embodiment shown in FIG. 12, the ED and network device are shown as being the UE 402 and the network device 452 of FIG. 6. In addition, the network device is shown as being a TRP 452. As in FIGS. 9 and 10, the ML module 500 of the TRP 452 and the ML module 510 of the UE 402 are shown in FIG. 12, but the other components of the TRP 452 and the UE 402 are omitted to simplify the drawing. The same reference numbers have been used to identify the same or similar components/elements in the drawing.

In this embodiment, the ML module 500 of the TRP 452 and the ML module 510 of the UE 402 are trained in a one-step joint training process. The one-step joint training process is indicated at 910 in FIG. 12. In this example, the ML module 500 includes a neural network 502 that implements a function g(x) and the ML module 510 includes a neural network 512 that implements a function f(x). During the one-step joint training process 910, the ML module 500 of the TRP 452 and the ML module 510 of the UE 402 are jointly trained using:

- uplink channel state information UL H'904 as an ML module input of the ML module 500 and compressed MCS parameters MCS'906 as an ML module output of the ML module 500; and
- downlink channel state information DL H 914, compressed MCS parameters MCS'906 received from the TRP 452, or both, as an ML module input of the ML module 510 and MCS parameters MCS 916 as an ML module output of the ML module 510.

For example, in this embodiment joint training of the ML modules 500 and 510 might involve joint optimization of the neural network 502 implementing the function g(x) and the neural network 512 implementing the function f(x) in order to satisfy the joint training targets of optimizing a communication performance metric (e.g., maximizing throughput) subject to ensuring that the MCS output MCS 916 of the ML module 510 at the UE 402 matches the MCS output MCS'906 of the ML module 500 at the TRP 452. For example, the neural network 502 implementing the function g(x) and the neural network 512 implementing the function f(x) may be trained to satisfy the following condition:

$$g, f = \text{argmax Throughput}(f(g(H')), H)$$

where g( ) and f( ) are the functions g(x) and f(x) implemented by the neural networks 502 and 512, respectively, H' is the uplink channel state information UL H'904 and H is the DL channel state information DL H 904.

In this embodiment, once the ML modules 500 and 510 have been trained, the TRP 452 uses the trained ML module 500 to predict, based on using the uplink channel state information UL H'904 at slot n1 as an input to the trained ML module 500, compressed MCS parameters MCS'906 corresponding to optimal modulation order and/or coding rate for RBs scheduled at slot n1+m. For example, in some embodiments the neural network 502 of the ML module 500 may include one or more layers that function as the encoder portion of an AE structure to generate the compressed MCS parameters MCS'906 as the latent space z of the AE structure. In some embodiments, the TRP 452 may send the compressed MCS parameters MCS'906 to the UE. In other embodiments the compressed MCS parameters MCS'906 are not sent to the UE during the normal operation phase once the training process has successfully been completed, even if they were sent to the UE as part of the training process.

On the UE side, once the ML modules 500 and 510 have been trained, the UE 402 uses the trained ML module 510 to predict, based on using the downlink channel state information DL H 914 at slot n2, the compressed MCS parameters MCS'906 received from the TRP 452, or both, as an input to the trained ML module 510, MCS parameters MCS 916 that should match the optimal MCS parameters that correspond to the compressed MCS parameters MCS'906 predicted by the TRP 452 for the scheduled RBs at slot n1+m.

For example, in some embodiments the TRP 452 does not send the compressed MCS parameters MCS'906 to the UE 402, and the UE 402 uses only the downlink channel state information DL H 914 at slot n2 to predict the MCS parameters MCS 916 that should match the optimal MCS parameters that correspond to the compressed MCS parameters MCS'906 predicted by the TRP 452 for the scheduled RBs at slot n1+m.

In other embodiments, the TRP 452 does send the compressed MCS parameters MCS'906 to the UE 402, and the UE either:

- uses only the compressed MCS parameters MCS'906 to predict the MCS parameters MCS 916 that should match the optimal MCS parameters that correspond to the compressed MCS parameters MCS'906 predicted by the TRP 452 for the scheduled RBs at slot n1+m;

or

- uses the compressed MCS parameters MCS'906 and the downlink channel state information DL H 914 at slot n2 to predict the MCS parameters MCS 916 that should match the optimal MCS parameters that correspond to the compressed MCS parameters MCS'906 predicted by the TRP 452 for the scheduled RBs at slot n1+m.

Link adaptation procedures utilizing ML modules trained in accordance with the one-step training process described above may provide several benefits/advantages over conventional link adaptation procedures such as the conventional link adaptation procedure shown in FIG. 5. For example, link adaptation procedures utilizing such trained ML modules allow pairs of devices to obtain optimal MCS parameters for communication with one another based on potentially only DL and/or UL channel information with minimal or reduced air-interface overhead.

The embodiments discussed above with reference to FIGS. 9 to 12 use DL or UL channel information as the input of ML modules to predict optimal MCS parameters. In some embodiments other parameters may be used instead of or in addition to DL or UL channel information in order to facilitate optimal MCS selection. In addition, in some embodiments the output of the ML modules may be different for different optimization goals, such as for highest throughput, or lowest latency, etc.

In this embodiment, other parameters are used as the input of AI/ML network. In addition, output of AI/ML network can be different for different optimization goals, such as for highest throughput, or lowest latency and etc.

Figure 13:
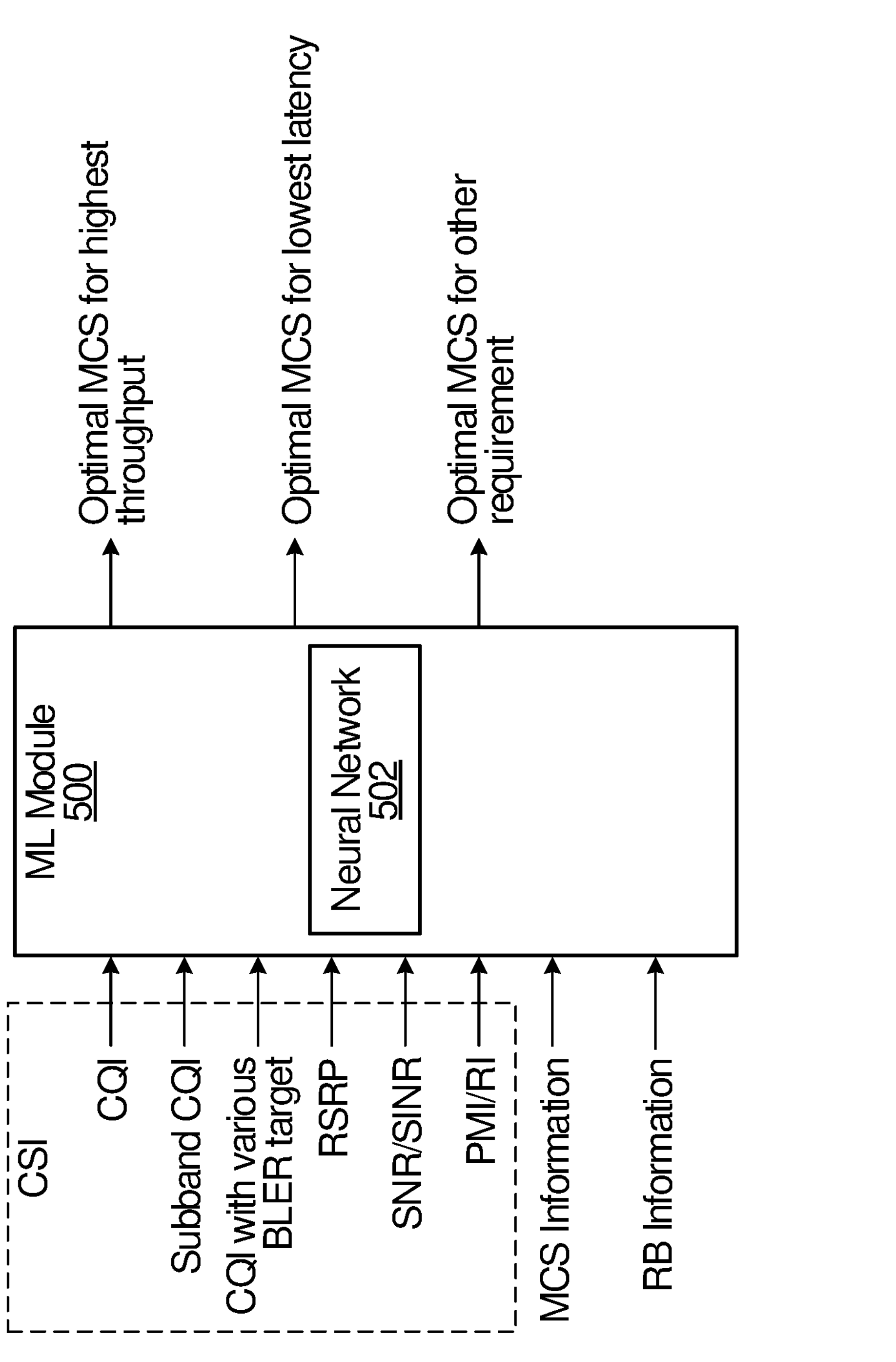
FIG. 13 illustrates an example of inputs and outputs of a machine learning module of an ED and/or a network device in order to facilitate link adaptation between the ED and the network device, according to another embodiment.

For example, FIG. 13 illustrates an example of inputs and outputs of a ML module that, once trained, is configured to facilitate link adaptation between two devices, such as an ED and a network device, according to another embodiment. In this example, the ML module is shown as being the ML module 500 of the TRP 452 of FIG. 6, which in this example implements a neural network 502.

As shown in FIG. 13, input(s) of the ML module 500 might include one or more of the following:

- MCS information including:
  - modulation order (e.g. BPSK, QPSK, 8PSK, 16QAM, 64QAM, 256QAM) and/or coding rate potentially with more than the 29 coding rate values available in 5G/NR (e.g. coding rate values=0.001*N, 0<N<1000)

RB information indicating the RB(s) that may be scheduled at a given time

CSI information, such as one or more of:

- CQI value
- Subband CQI value and the size of a subband may be configurable (e.g. RB level subband)
- CQI value with various BLER targets (e.g., 0.00001, 5%, 10%, 20%, 30%, etc.)
- RSRP
- SNR/SINR
- PMI/RI In addition, as shown in FIG. 13, output(s) of the ML module 500 might include one or more of the following:

- Optimal wideband MCS for highest throughput
- Optimal wideband MCS for lowest latency
- Optimal wideband MCS for lowest BLER
- Optimal subband MCS for highest throughput
- Optimal subband MCS for lowest latency
- Optimal subband MCS for lowest BLER An example of a training process to train the ML module 500 of FIG. 13 will now be described in the context of the ML module 500 being implemented at the network device 452 in the wireless system 100 of FIG. 6.

In this example, the training procedure begins with the network device 452 transmitting training signals to the UE 402 with different modulation orders, coding rates and scheduled RB locations. The UE 402 then sends feedback to the network device 452 based on the training signals. For example, the feedback might include CQI value(s). In some embodiments the CQI value(s) might include subband CQI values of fine granularity (e.g. RB level granularity), potentially for various BLER targets. To reduce the overhead of feedback, an auto-encoder network can be used for signaling compression, as described above. The network device 452 completes training of the ML module 500 and sends configuration information of the trained ML module 500 to the UE 402 so that the UE can configure the ML module 510 to match the trained ML module 500. Therefore, the same trained ML module can be configured at both the UE 402 and the network device 452.

In this example, the goal of ML module training may be to have matching ML modules at the network device 452 and the UE 402 so that, once the ML module 510 at the UE has been trained, the UE 402 is able to use the trained ML module 510 to predict, based on RB location(s) indicated by DCI from the network device 452, the modulation order(s) and/or coding rate(s) (potentially with finer frequency granularity than NR) for wideband TB mapping (one TB mapped to scheduled RBs), or for subband TB mapping (one TB is segmented to multiple CBGs (code block groups), and one or multiple CBGs are mapped to one subband). In this scenario with the above training goal, the normal operation procedure following a successful training process might proceed as follows.

On the network side, the network device 452 sends scheduling DCI to the UE 402. For example, the scheduling DCI might include one or some of the following fields:

- Frequency domain resource assignment
- Time domain resource assignment
- No MCS field, or only modulation order
- AI output indication (e.g., indicating whether to choose optimal MCS for throughput or latency or other)
- Indication of one of the following TB mapping methods:
  - Option 1): TB level coding rate and modulation order (only one modulation order and coding rate for one TB);
  - Option 2) TB level coding rate and subband level modulation orders (only one coding rate for one TB, subband-specific modulation orders for different frequency subbands;
  - Option 3) Subband level modulation orders and coding rates (subband-specific modulation orders and coding rates for different frequency subbands)

On the UE side, the UE 402 receives the scheduling DCI from network device 452 and determines the RBs allocated for downlink transmission to the UE 402 based on the content of the DCI, e.g., based on the frequency domain resource assignment field and/or the time domain resource assignment field. The UE 402 then uses the trained ML module 510 to predict, based on using RB information regarding the allocated RBs as an input to the trained ML module 510, optimal MCS parameters that indicate the modulation order(s) and/or coding rate(s) for the allocated RBs. As shown in FIG. 13, the MCS output of the trained ML modules may be different for different optimization goals, such as for highest throughput, or lowest latency, etc. On the UE side, selecting which of these different optimized MCS outputs is generated by the trained ML module 510, or selecting between the different optimized MCS outputs if the ML module 510 is configured to generate optimized MCS outputs for different optimization goals, may be done dynamically based on the content of the AI output indication field of the scheduling DCI or may be semi-statically configured by the network, e.g., by RRC, or MAC-CE.

Figure 14:
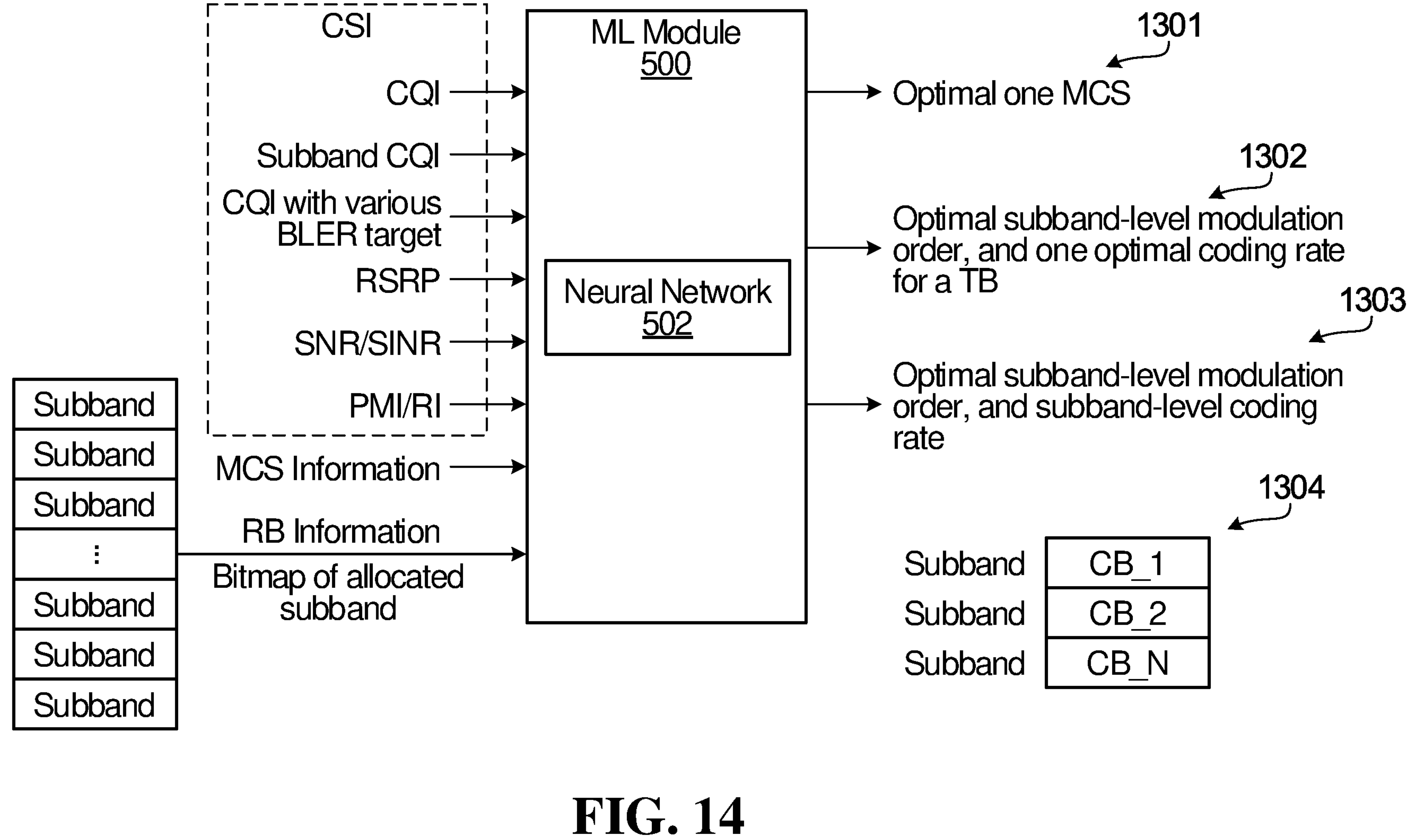
FIG. 14 illustrates and example of MCS parameter inference using a bitmap of allocated subband(s) as an input to a trained ML module, according to one embodiment.

As discussed above, in some embodiments the scheduling DCI sent by the network device 452 may include a field indicating which one of a plurality of predefined TB mapping methods will be used by the network device 452 for downlink transmission to the UE 402. In such embodiments, the UE may use the RB information regarding the allocated RBs to calculate a bitmap of allocated subband(s). From the perspective of the UE 402, a subband may be considered to be an allocated subband if at least one RB in the subband is allocated to the UE 402. The UE then uses the bitmap of the allocated subband(s) as an input to the trained ML module 510 to predict optimal MCS parameters that indicate the modulation order(s) and/or coding rate(s) for the allocated subband(s). For example, FIG. 14 illustrates an example of MCS parameter inference using the trained machine learning module 510 of the ED 402, using a bitmap of allocated subband(s) as an input to the trained ML module 510, according to one embodiment. In this example, For example, if the TB mapping method field in the scheduling DCI indicates that Option 1) TB mapping is used, then there is only one MCS for the TB, as indicated at 1301 in FIG. 14. However, if the TB mapping method field indicates Option 2) TB mapping, then there is one coding rate for the TB and subband level modulation order(s), as indicated at 1302 in FIG. 14. Alternatively, if the TB mapping method field indicates Option 3) TB mapping, then there is subband level coding rate(s) and modulation order(s), as indicated at 1303 in FIG. 14. For Option 3) each codeblock (CB) of the TB is wholly contained in one or an integer number of subbands, as indicated at 1304 in FIG. 14.

The UE 402 then uses the predicted modulation order(s) and coding rate(s) generated by the trained ML module 510 and the available resource elements (REs) to calculate the transport block size (TBS) and decode the corresponding PDSCH.

The embodiments depicted in FIGS. 13 and 14 potentially address several of the problems associated with conventional link adaptation procedures that were discussed above with reference to the conventional link adaptation procedure shown in FIG. 5. For example, the use of the trained ML module to predict the instantaneous optimal MCS at a UE/TRP addresses the first problem associated with the non-real-time nature of MCS selection in the conventional link adaptation procedure. In addition, the potential to use a greater number of coding rate sets (potentially many more than the 29 coding rate values available in 5G/NR) or rateless coding addresses the second problem discussed above. Furthermore, the possibility of utilizing subband CQI values (e.g., RB level CQI reporting) as inputs to the ML module to predict subband level modulation orders and/or subband level coding rates addresses the third problem associated with the coarseness of frequency selecting scheduling in conventional link adaptation procedures.

The above discussion refers to many examples where the network-side training is performed by a TRP. In other examples, AI/ML component training may not be performed by the TRP. For example, referring again to FIG. 1, training may be performed by the core network 130 or elsewhere in the wireless system 100 (e.g., using cloud computing). A TRP 170/452 may simply collect the relevant data and forward the data to the appropriate network entity (e.g., the core network 130) to perform the necessary training. The trained AI/ML component parameters, e.g., weights of trained NN(s), may then be provided to the TRP 170/452 and ED(s) 110/402.

Although the above discussion is mainly in the context of a network device, such as a T-TRP or NT-TRP, in the role of a transmitter and an ED, such as a UE, in the role of a receiver, it should be understood that the transmitter and receiver roles may be reversed (e.g., for uplink communications). Further, it should be understood that the transmitter and receiver roles may be at two or more EDs (e.g., for sidelink communications).

Example Methods

Figure 15:
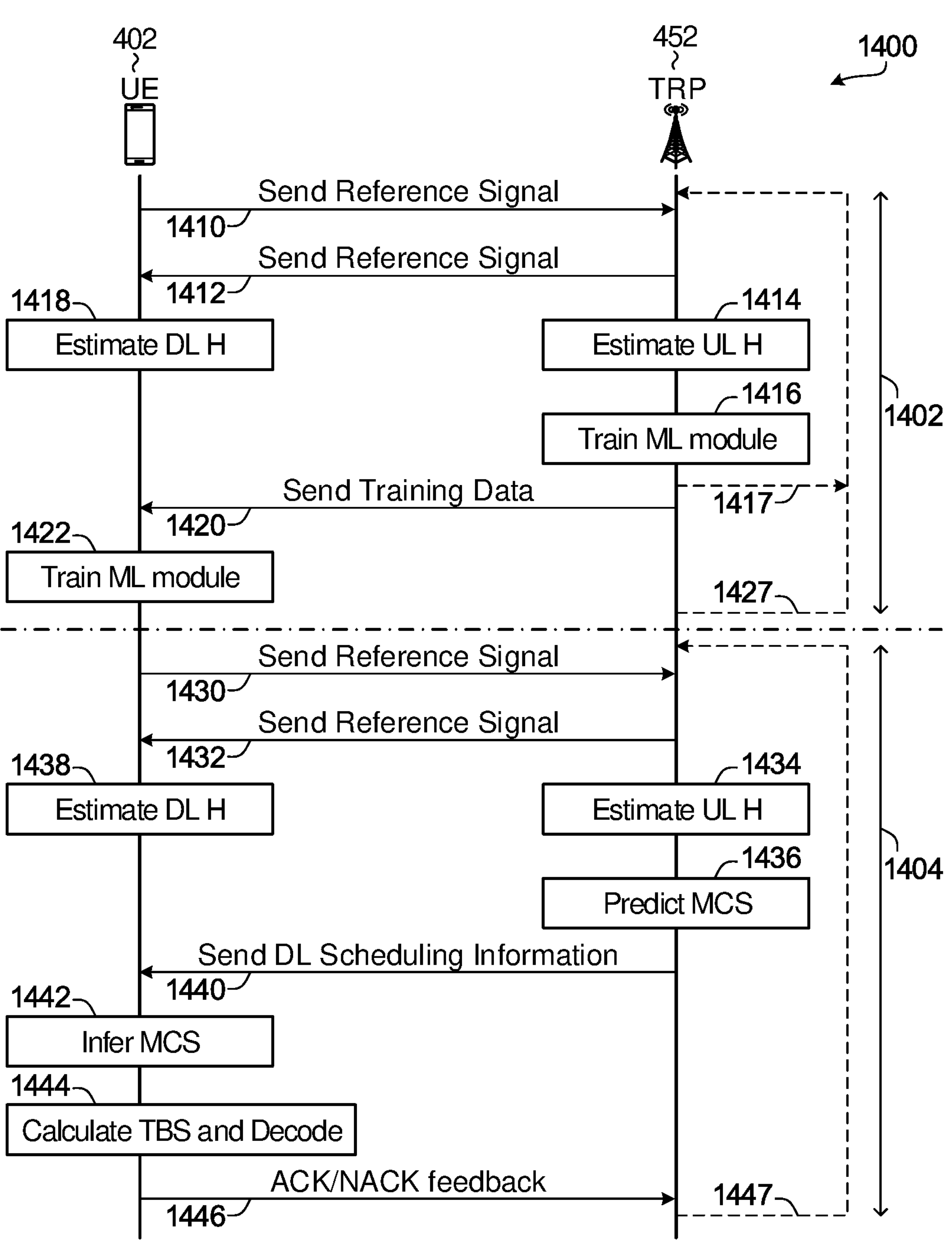
FIGS. 15, 16, 17 and 18 illustrate methods performed by a first device and a second device, according to various embodiments.

FIG. 15 illustrates a signal flow diagram 1400 for a method performed by a pair of devices in a wireless communication network, according to one embodiment. The pair of devices may be an ED and a network device, e.g., a UE 402 and a TRP 452, although not necessarily.

In the signal flow diagram 1400, UE 402 and TRP 452 are involved in an information exchange for a AI/ML training phase 1402 and a normal operations phase 1404. Although only one UE and one TRP are shown in FIG. 15 to avoid congestion in the drawing, data collection or information sharing during training, and similarly operation of a communication network, are expected to involve more than one UE and more than one TRP. For example, in some embodiments training may be done with the joint efforts from multiple network devices and multiple UEs and link adaptation optimization may be done on a per UE basis.

The method begins with UE 402 sending a reference signal at 1410. For example, the reference signal may be a UL SRS that the UE transmits during an UL time slot n1, as described earlier. At 1412, TRP 452 sends a reference signal 1412, which may be a DL CSI-RS that the TRP transmits during a DL time slot n2, e.g., the DL time slot n2 may be the next time slot after the UL time slot n1, as described earlier.

In the signal flow diagram 1400 shown in FIG. 15, the AI/ML training phase 1402 is a two-step joint training phase in which an ML module at TRP 452 is trained in a first step at 1416 and an ML module at UE 402 is trained in a second step at 1422. In particular, at 1414, TRP 452 obtains uplink channel state information based on the UL reference signal received from UE 402 at 1410, and the ML module at TRP 452 is trained at 1416 using the uplink channel state information as an input to the ML module and one or more MCS parameters as an output to satisfy a training target. For example, the training target may be to maximize DL throughput between TRP 452 and UE 402, as described earlier. Once training of the ML module at TRP 452 has successfully completed (i.e., the training target has been satisfied), training data for use in training the ML module at UE 402 is sent to the UE at 1420. In this example, the training data includes the one or more MCS parameters predicted by the trained ML module at the TRP 452 using the uplink channel state information based on the UL reference signal received from UE 402 at 1410. At the UE side, UE 402 obtains downlink channel state information at 1418 based on the DL reference signal received from TRP 452 at 1412. At 1422, the ML module at UE 402 is trained via reinforcement training using: the downlink channel state information as an input to the ML module; one or more MCS parameters as an output of the ML module; and the training data received at 1420 as labeled data, with the goal of matching the one or more MCS parameters of the ML module output of the ML module of UE 402 to the one or more MCS parameters predicted by the ML module of TRP 452.

In some embodiments this training process is done iteratively, as indicated at 1417 or 1427 in FIG. 15, whereby UE 402 and TRP 452 repeatedly send reference signals, obtain channel state information based on the corresponding reference signals and iteratively refine the configuration parameters (e.g., NN weights) of their respective ML module. In some embodiments this iterative process may continue until their respective training target(s) is/are satisfied or until a predefined number of iterations have occurred.

After successful completion of the training phase 402, the trained ML modules of UE 402 and TRP 452 are used to predict optimal MCS parameters for downlink communication between TRP 452 and UE 402 in the normal operations phase 1404. In the normal operations phase 1404, UE 402 and TRP 452 send reference signals at 1430 and 1432, respectively. For example, the reference signal transmitted by UE 402 at 1430 may be an UL SRS that the UE transmits during an UL time slot n1, and the reference signal transmitted by TRP 452 at 1432 may be a DL CSI-RS that the TRP transmits during a DL time slot n2, e.g., the DL time slot n2 may be the next time slot after the UL time slot n1, as described earlier.

At 1434, TRP 452 obtains uplink channel state information based on the UL reference signal received from UE 402 at 1430 (e.g., at time slot n1). At 1436, the ML module at TRP 452 is used to obtain, based on using the channel state information obtained at 1434 as an input to the trained ML module, one or more MCS parameters to use for a scheduled downlink transmission to UE 402 (e.g., for a scheduled downlink transmission at time slot n1+m). At 1440, scheduling information for the scheduled downlink transmission is sent to UE 402. For example, the scheduling information may be sent via DCI that includes one or more of the following fields: a frequency domain resource assignment field; a time domain resource assignment field; no MCS field, or only a modulation order field; an AI output indication field (e.g., indicating whether to choose optimal MCS for throughput or latency or other); and/or a TB mapping method field, as described earlier.

At the UE side, UE 402 obtains downlink channel state information at 1438 based on the DL reference signal received from TRP 452 at 1432 (e.g., at time slot n2). At 1442, the ML module at UE 402 is used to infer, based on using the channel state information obtained at 1438 and resource block allocation information based on the scheduling information received at 1440 as inputs to the trained ML module, one or more MCS parameters to use for the scheduled downlink transmission to UE 402 indicated in the scheduling information received at 1440 (e.g., for a scheduled downlink transmission at time slot n1+m).

At 1444, UE 402 uses the inferred modulation order(s) and coding rate(s) generated by the trained ML module at 1442 and the scheduling information received at 1440 to calculate the TBS and decodes the corresponding PDSCH in order to receive the scheduled downlink transmission.

At 1446, UE 402 transmits ACK/NACK feedback to TRP 452 to indicate whether the PDSCH for the schedule downlink transmission was successfully decoded. For example, if the corresponding PDSCH is correctly decoded, UE 402 may send an ACK indication to TRP 452, otherwise, the UE may send a NACK indication to TRP 452.

TRP 452 receives the ACK/NACK feedback from UE 402 at 1446. If it is ACK, this transmission is finished. If it is NACK, TRP 452 starts a link adaptation procedure as indicated at 1447 in order to adjust the MCS and/or time-frequency resources for retransmission.

The two-step training process in the training phase 1402 depicted in FIG. 15. which utilizes UL channel information as an ML module input at the TRP 452 and DL channel information as an ML module input at the UE 402, tends to provide better performance when there is high reciprocity between UL and DL channels. For FDD communication, or other scenarios in which there may be limited reciprocity between the UL and DL channels used for communication between two devices, the same channel information (e.g., DL channel information) may be used as the input of ML modules at both devices. For example, the DL channel state information obtained by the UE 402 and used as an input to the ML module of the UE at 1422 may be transmitted to the TRP 452 to be used as an input to the ML module of the TRP 452.

Figure 16:
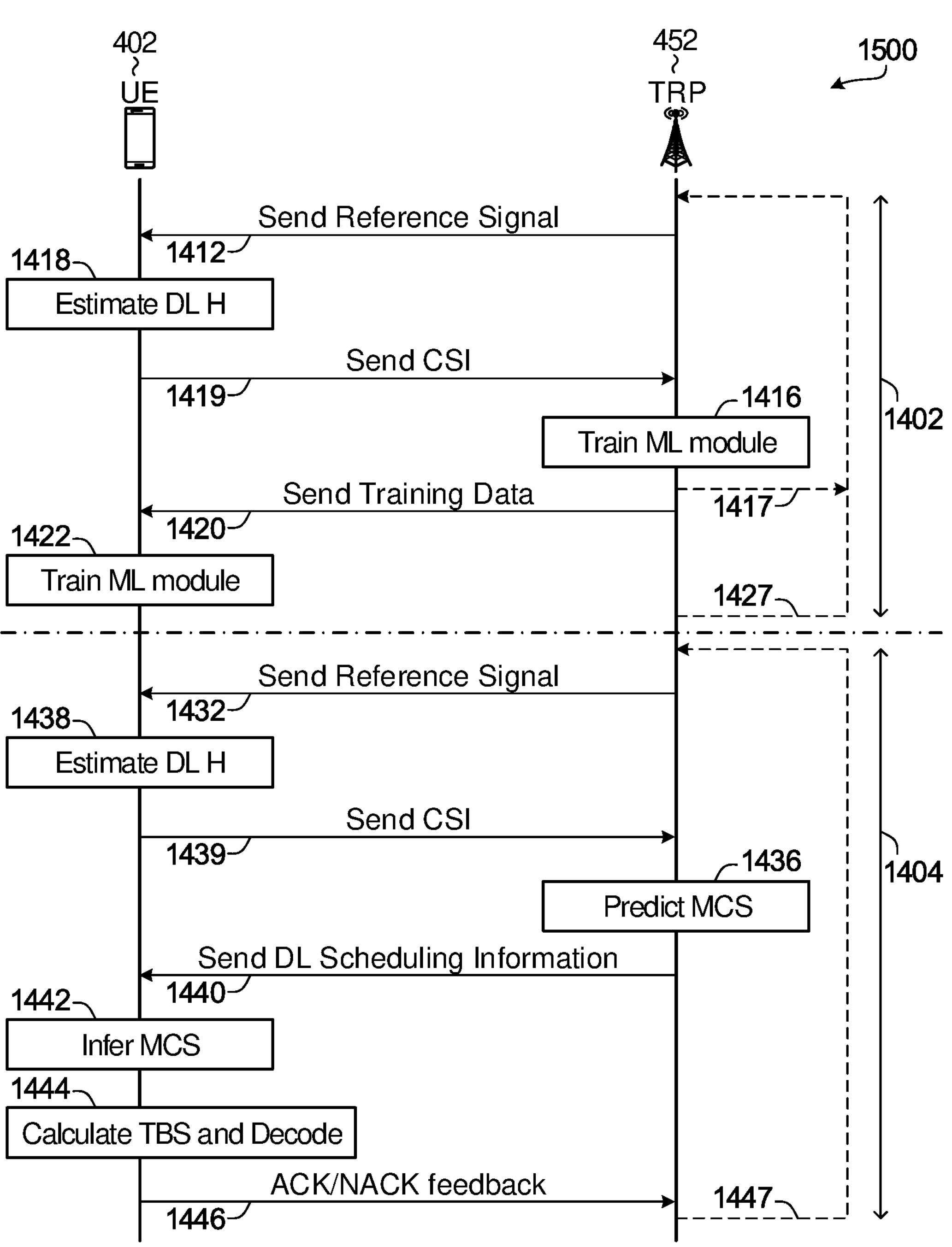

For example, FIG. 16 illustrates an example of a signal flow diagram 1500 that is similar to the signal flow diagram 1400 of FIG. 15, but in this example the DL channel state information obtained by the UE, or an encoded version thereof, is sent to the TRP 452 to use as an input to the ML module of the TRP 452. For the sake of conciseness, only those aspects of the signal flow diagram 1500 that differ from those of the signal flow diagram 1400 of FIG. 15 are discussed in detail below.

Similar to the signal flow diagram 1400 of FIG. 15, in the signal flow diagram 1500 of FIG. 16, UE 402 and TRP 452 are involved in an information exchange for a AI/ML training phase 1402 and a normal operations phase 1404. However, in the training phase 1402 and the normal operations phase 1404 of the signal flow diagram 1500 of FIG. 16, the sending of an UL reference signal at 1410 and 1430 and the estimation of the uplink channel to obtain UL channel state information based on the UL reference signal at 1414 and 1434 are omitted, and instead UE 402 sends DL channel state information to TRP 452 at 1419 and 1439.

In order to reduce the overhead associated with making the DL channel state information available to TRP 452, the DL channel state information H obtained at 1418 and 1438 may be compressed using an encoder (e.g., the encoder portion of an autoencoder) to generate compressed DL channel state information z, which is then sent to TRP 452 at 1419. In this scenario, in the training phase 1402, compressed DL channel state information z received by TRP 452 at 1419 is decoded at TRP 452 using a decoder (e.g., the decoder portion of an autoencoder) to obtain reconstructed DL channel state information H', which is then used as an input of the ML module of TRP 452 at 1416. Similarly, in the normal operation phase 1404, compressed DL channel state information z received by TRP 452 at 1439 is decoded to obtain reconstructed DL channel state information H', which is then used as an input of the ML module of TRP 452 at 1436.

Once training of the ML module at TRP 452 has successfully completed, training data for use in training the ML module at UE 402 is sent to the UE at 1420, and the two-step training phase 1402 continues on as explained above with reference to FIG. 15. Similarly, once the trained ML module of TRP 452 has been used to predict one or more MCS parameters at 1436, the normal operation phase 1404 continues on similar to the normal operation phase 1404 of the signal flow diagram 1400 illustrated in FIG. 15. It is noted that, if compressed DL channel state information z was sent to TRP 452 at 1419 and 1439, the DL channel state information H obtained at 1418 or the compressed DL channel state information z may be used as an input of the ML module of the UE 402 at 1422 and 1442.

In the methods illustrated in the signal flow diagrams 1400 and 1500 of FIGS. 15 and 16, the training phase 1402 is a two-step joint training process whereby the ML module of a first one of the devices (e.g., TRP 452 in the above examples) is trained in a first step, and then the ML module of the second device (e.g., UE 402 in the above examples) is trained via reinforcement learning using predicted MCS parameter outputs of the trained ML module of the first as labeled data. In other embodiments, once the ML module of the first device has been successfully trained, trained weights for the ML module of the first device may be sent to the second device to enable the second device to implement the same trained ML module.

Figure 17:
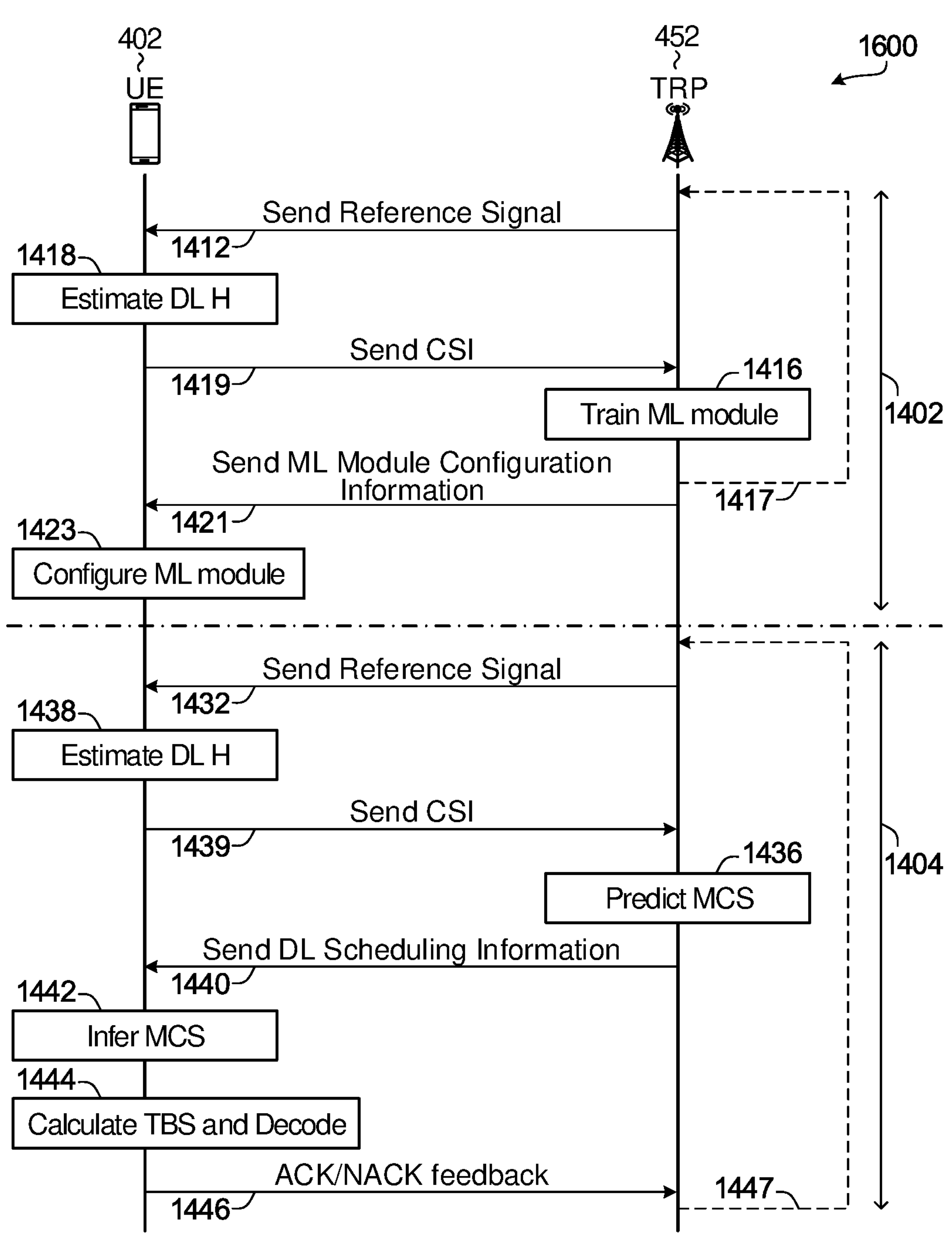

For example, FIG. 17 illustrates an example of a signal flow diagram 1600 that is similar to the signal flow diagram 1500 of FIG. 15, but in this example once training of the ML module at TRP 452 has successfully completed at 1416, rather than sending training data for use in reinforcement training of the ML module of UE 402 at 1420, TRP 452 instead sends ML module configuration information to UE 402 at 1421. The ML module configuration information includes configuration information for the ML module of UE 402 (e.g., trained neural network weights) to enable UE 402 to configure its ML module at 1423 to implement the same AI/ML model as ML module of TRP 452 without having to go through the training process indicated at 1422 in the signal flow 1500 of FIG. 16. ML module training can be computationally intensive, and therefore reducing or eliminating the need for training computations on a device can be very beneficial, particularly in cases where computation and/or power resources are limited (e.g., in mobile devices).

In some embodiments, the reference signals sent by TRP 452 at 1412 and 1432 may each include a plurality of reference signals in different time-frequency resource block locations. In some such embodiments, the plurality of reference signals might include reference signals with different modulation orders, different coding rates or both different modulation orders and different coding rates. For example, in such embodiments, the channel state information sent by UE 402 at 1419 and 1439 in FIGS. 16 and 17 might include fine granularity CQI values (e.g., subband-level CQI values)

and/or CQI values for different BLER targets (e.g., 0.00001, 5%, 10%, 20%, 30%, etc.), as described earlier.

For example, in the normal operation phase 1404, the reference signal sent by TRP 452 at 1432 may include reference signals for two candidate scheduled RB sets, e.g. candidate scheduled RB set 1=RB 0~4 and candidate scheduled RB set 2=RB 5~9, for which UE 402 provides CSI feedback at 1439. At 1436, the trained ML module of TRP 452 is used to predict optimal MCS for each candidate scheduled RB set, e.g. MCS1 for RB0~4 AND MCS2 for RB 5~9, and the TRP 452 may then select the candidate scheduled RB set with the better link performance to use for the downlink transmission, e.g. RB 0~4 if MCS1>MCS2 or RB 5~9 if MCS2>MCS1. The TRP 452 may then send scheduling information to the UE 402 (e.g., via DCI) at 1440 to indicate which RBs have been allocated for a scheduled downlink transmission to the UE 402. At the UE side, the trained ML module of UE 402 is used at 1442 to infer optimal MCS for each candidate scheduled RB set, and based on the RB allocation information received at 1140 from the TRP 452, the UE 452 can infer the optimal MCS the TRP 452 has selected for the scheduled RBs.

In this example, the training data includes the one or more MCS parameters predicted by the trained ML module at the TRP 452 using the uplink channel state information based on the UL reference signal received from UE 402 at 1410. At the UE side, UE 402 obtains downlink channel state information at 1418 based on the DL reference signal received from TRP 452 at 1412. At 1422, the ML module at UE 402 is trained via reinforcement training using: the downlink channel state information as an input to the ML module; one or more MCS parameters as an output of the ML module; and the training data received at 1420 as labeled data, with the goal of matching the one or more MCS parameters of the ML module output of the ML module of UE 402 to the one or more MCS parameters predicted by the ML module of TRP 452.

Figure 18:
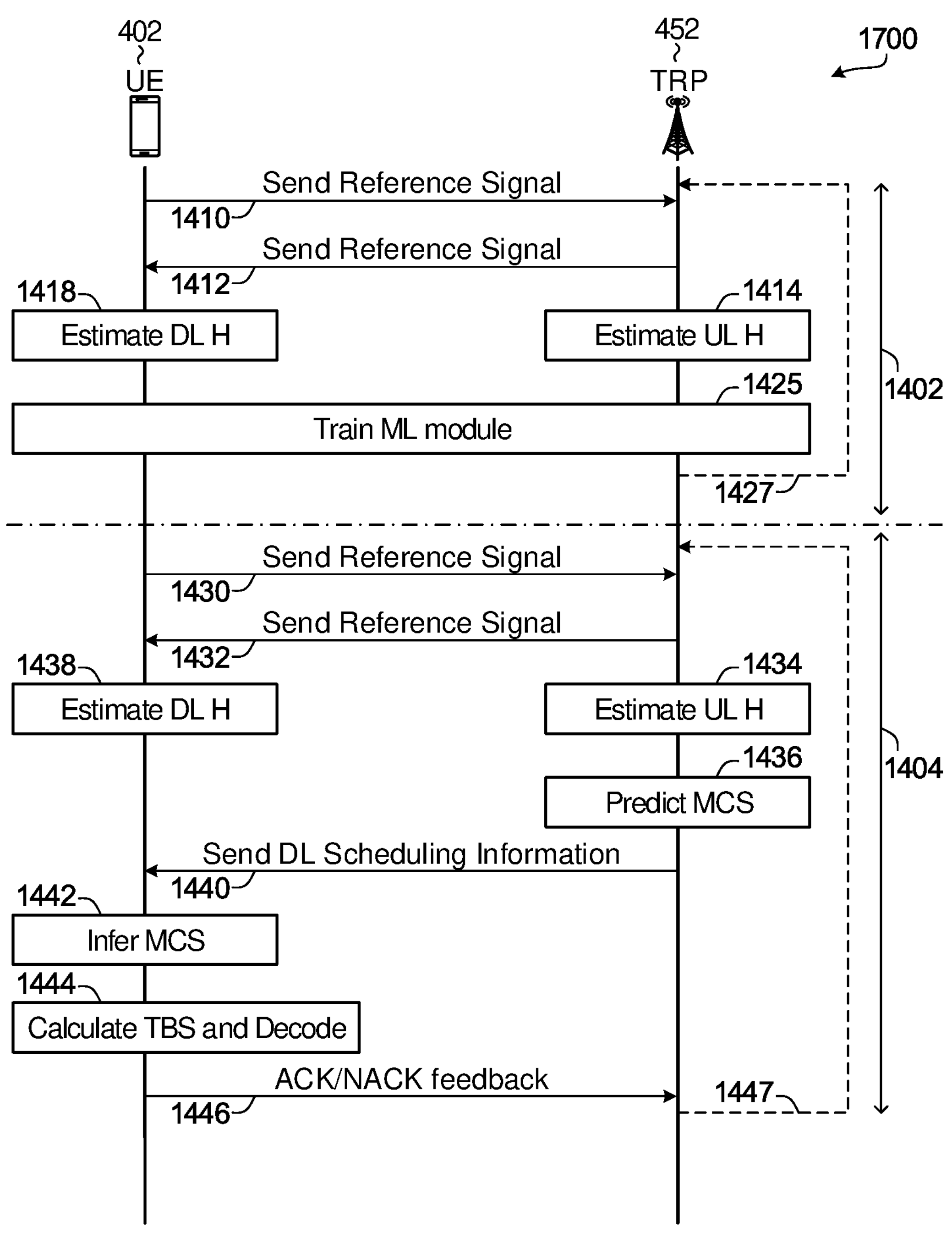

Referring again to FIG. 15, it is noted that in the signal flow diagram 1400 the training phase 1402 is a two-step joint training phase. FIG. 18 illustrates an example of a signal flow diagram 1700 that is similar to the signal flow diagram 1400 of FIG. 15, but in this example the training phase 1402 is a one-step joint training phase. For the sake of conciseness, only those aspects of the signal flow diagram 1700 that differ from those of the signal flow diagram 1400 are discussed in detail below. In particular, in the signal flow diagram 1700 of FIG. 18, rather than training the ML modules of TRP 452 and UE 402 in two steps at 1416 and 1422, respectively, the ML modules of TRP 452 and UE 402 are instead jointly trained together in one step as indicated at 1425 in FIG. 18. For example, similar to the example embodiment described earlier with reference to FIG. 12, the ML modules of TRP 452 and UE 402 may include neural networks that implement functions g(x) and f(x), respectively, and during the one-step joint training process at 1425 the ML modules of TRP 452 and UE 402 may be jointly trained using:

- uplink channel state information UL H obtained at 1414 as an input of the ML module of TRP 452 and compressed MCS parameters MCS' as an output of the ML module of TRP 452; and
- downlink channel state information DL H obtained at 1418, compressed MCS parameters MCS' received from TRP 452, or both, as an input of the ML module of UE 402 and MCS parameters MCS as an ML module output of the ML module of UE 402.

For example, in this embodiment joint training of the ML modules at 1425 might involve joint optimization of the neural networks implementing the functions g(x) and f(x) in order to satisfy the joint training targets of optimizing a communication performance metric (e.g., maximizing throughput) subject to ensuring that the MCS output MCS of the ML module of UE 402 matches the MCS output MCS' of the ML module of TRP 452. For example, the neural networks implementing the functions g(x) and f(x) may be trained to satisfy the following condition:

$$g, f = \text{argmax Throughput}(f(g(H')), H)$$

where g( ) and $f$( ) are the functions g(x) and f(x) implemented by the neural networks of TRP 452 and UE 402, respectively, H' is the uplink channel state information UL H obtained at 1414 and H is the DL channel state information DL H obtained at 1418.

In this embodiment, in the normal operation phase 1404 the TRP 452 at 1436 uses its trained ML module at 1434 to predict, based on using the uplink channel state information UL H obtained at 1434 (e.g., uplink channel state information for a time slot n1) as an input to the trained ML module, compressed MCS parameters MCS' corresponding to optimal modulation order(s) and/or coding rate(s) for scheduled RBs (e.g., RBs that may be allocated for a downlink transmission to UE 402 at time slot n1+m). For example, in some embodiments the neural network of the ML module of TRP 452 may include one or more layers that function as the encoder portion of an AE structure to generate the compressed MCS parameters MCS' as the latent space z of the AE structure. In some embodiments, the TRP 452 may send the compressed MCS parameters MCS' to the UE 402 as part of the scheduling information sent at 1440. In other embodiments the compressed MCS parameters MCS'906 are not sent to the UE 402 during the normal operation phase 1404, even if they were sent to the UE as part of the joint training at 1425 in the training phase 1402.

On the UE side, in the normal operation phase 1404 the UE 402 uses its trained ML module at 1442 to infer, based on using the downlink channel state information DL H obtained at 1438 (e.g., downlink channel state information for a time slot n2), compressed MCS parameters MCS'906 received from the TRP 452, or both, as an input to the trained ML module, MCS parameters MCS that should match the optimal MCS parameters that correspond to the compressed MCS parameters MCS' predicted by the trained ML module of TRP 452 for the scheduled RBs (e.g., the RBs allocated for downlink transmission to UE 402 at slot n1+m).

For example, in some embodiments the TRP 452 does not send the compressed MCS parameters MCS' to the UE 402 as part of the scheduling information sent at 1440, and the UE 402 uses only the downlink channel state information DL H obtained at 1438 to infer the MCS parameters MCS at 1442. In other embodiments, the TRP 452 does send the compressed MCS parameters MCS' to the UE 402 at 1440, and the UE either:

- uses only the compressed MCS parameters MCS' to infer the MCS parameters MCS at 1442;

or

- uses the compressed MCS parameters MCS' received at 1440 and the downlink channel state information DL H obtained at 1438 to infer the MCS parameters MCS at 1442.

Examples of devices (e.g. ED or UE and TRP or network device) to perform the various methods described herein are also disclosed.

For example, a first device may include a memory to store processor-executable instructions, and a processor to execute the processor-executable instructions. When the processor executes the processor-executable instructions, the processor may be caused to perform the method steps of one or more of the devices as described herein, e.g. in relation to FIGS. 15 to 18. As one example, the processor may obtain channel state information characterizing a wireless communication channel between the first device and a second device, and train an ML module using the channel state information as an ML module input and one or more MCS parameters as an ML module output to satisfy a training target. For example, the processor may cause the device to communicate over an air interface in a mode of operation by implementing operations consistent with that mode of operation, e.g. performing necessary measurements and generating content from those measurements, as configured for the mode of operation, preparing uplink transmissions and processing downlink transmissions, e.g. encoding, decoding, etc., and configuring and/or instructing transmission/reception on an RF chain.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

DEFINITIONS OF ACRONYMS

NR New Radio
AI Artificial Intelligence
ACK Acknowledgement
BWP Bandwidth part
BLER Block Error Rate
BS Base Station
CB Code block
CBG Code block group
CCE Control channel element
CRC Cyclic redundancy check
CSI Channel State Information
CSI-RS Channel State Information-Reference Signal
CQI Channel Quality Indicator
DAI Downlink assignment index
DC Dual connectivity
DCI Downlink control information
DL Downlink
DL-SCH Downlink shared channel
EN-DC E-UTRA NR dual connectivity with MCG using E-UTRA and SCG using NR
FDD Frequency Division Duplexing
gNB Next generation (or 5G) base station
HARQ-ACK Hybrid automatic repeat request acknowledgement
MCG Master cell group
MCS Modulation and coding scheme
ML Machine Learning
MSE Mean Squared Error
NACK Non-Acknowledgement
NN Neural Network
PBCH Physical broadcast channel
PCell Primary cell
PDCCH Physical downlink control channel
PDSCH Physical downlink shared channel
PMI Pre-coding Matrix Indicator
PRACH Physical Random Access Channel
PRG Physical resource block group
PSCell Primary secondary cell
PSS Primary synchronization signal
PUCCH Physical uplink control channel
PUSCH Physical uplink shared channel
RACH Random access channel
RAPID Random access preamble identity
RB Resource block
RE Resource element
RI Rank Indicator
RRM Radio resource management
RMSI Remaining system information RS Reference signal
RSRP Reference signal received power
SCG Secondary cell group
SFN System frame number
SL Sidelink
SPS Semi-persistent scheduling
SR Scheduling request
SRI SRS resource indicator
SRS Sounding reference signal
SSS Secondary synchronization signal
TA Timing advance
TAG Timing advance group
TBS Transport block size
TUE target UE
UCI Uplink control information
UE User equipment
UL Uplink
UL-SCH Uplink shared channel

The invention claimed is:

1. A method in a first device in a wireless communication network, the method comprising:

obtaining channel state information characterizing a wireless communication channel between the first device and a second device in the wireless communication network;

training a machine learning (ML) module of the first device using the channel state information as an ML module input and one or more modulation and coding scheme (MCS) parameters as an ML module output to satisfy a training target, the one or more MCS parameters including a predicted modulation order, a predicted coding rate or both, wherein the ML module of the first device and a further ML module of the second device are trained to predict the same one or more MCS parameters.

2. The method of claim 1, wherein obtaining the channel state information comprises:

receiving, from the second device, a reference signal; and determining the channel state information based on the reference signal.

3. The method of claim 2, wherein the first device is a user equipment (UE) and the second device is a network device, the method further comprising:

receiving, from the network device, training data corresponding to the reference signal, the training data comprising information indicating one or more MCS parameters predicted by the network device, the one or more MCS parameters including a predicted modulation order, a predicted coding rate or both;

wherein training an ML module of the first device to satisfy a training target comprises training the ML module of the UE to satisfy a training target of matching the one or more MCS parameters of the ML module output of the ML module of the UE to the one or more MCS parameters predicted by the network device.

4. The method of claim 1, wherein the first device is a user equipment (UE) and the second device is a network device, the method further comprising:

transmitting, from the UE, a reference signal, wherein obtaining the channel state information comprises receiving, from the network device, a channel state information report that includes information indicating uplink channel state information determined by the network device based on the reference signal transmitted by the UE, and wherein using the channel state information as an ML module input comprises using the uplink channel state information as the ML module input.

5. The method of claim 1, wherein the first device is a network device and the second device is a user equipment (UE), the method further comprising:

transmitting, from the network device, a reference signal, wherein obtaining the channel state information comprises receiving, from the UE, a channel state information report that includes information indicating downlink channel state information determined by the UE based on the reference signal transmitted by the network device, and wherein using the channel state information as an ML module input comprises using the downlink channel state information as the ML module input.

6. The method of claim 2, wherein:

the first device is a network device and the second device is a user equipment (UE);

receiving, from the second device, a reference signal comprises receiving a reference signal from the UE;

determining the channel state information based on the reference signal comprises determining uplink channel state information based on the reference signal received from the UE; and using the channel state information as an ML module input comprises using the uplink channel state information as the ML module input.

7. A method in a first device in a wireless communication network, the method comprising:

obtaining channel state information characterizing a wireless communication channel between the first device and a second device in the wireless communication network; and obtaining, based on the channel state information as an input to a machine learning (ML) module of the first device that has been trained using channel state information characterizing a wireless communication channel between the first device and the second device in the wireless communication network as an ML module input and one or more modulation and coding scheme (MCS) parameters as an ML module output, one or more MCS parameters for communication between the first device and the second device, the one or more MCS parameters including a predicted modulation order, a predicted coding rate or both; and transmitting to or receiving from the second device over the wireless communication channel using the one or more MCS parameters, wherein the ML module of the first device and a further ML module of the second device are trained to predict the same one or more MCS parameters.

8. The method of claim 7, wherein obtaining the channel state information comprises:

receiving, from the second device, a reference signal; and determining the channel state information based on the reference signal.

9. The method of claim 8, wherein the first device is a user equipment (UE), the second device is a network device, the ML module used to obtain the one or more MCS parameters is trained to satisfy a training target of matching the one or more MCS parameters of the ML module output of the ML module of the UE to one or more MCS parameters predicted by the network device.

10. The method of claim 8, wherein the first device is a user equipment (UE), the second device is a network device, the method further comprising:

obtaining, based on the channel state information as an input to an ML encoder module of the UE, compressed channel state information; and transmitting a channel state information report to the network device, the channel state information report comprising the compressed channel state information.

11. The method of claim 7, wherein the first device is a user equipment (UE) and the second device is a network device, the method further comprising:

transmitting, from the UE, a reference signal, wherein obtaining the channel state information comprises receiving, from the network device, a channel state information report that includes information indicating uplink channel state information determined by the network device based on the reference signal transmitted by the UE, and wherein using the channel state information as an ML module input comprises using the uplink channel state information as the ML module input.

12. The method of claim 7, wherein the first device is a network device and the second device is a user equipment (UE), the method further comprising:

transmitting, from the network device, a reference signal, wherein obtaining the channel state information comprises receiving, from the UE, a channel state information report that includes information indicating downlink channel state information determined by the UE based on the reference signal transmitted by the network device, and wherein using the channel state information as an ML module input comprises using the downlink channel state information as the ML module input.

13. The method of claim 8, wherein:

the first device is a network device and the second device is a user equipment (UE);

receiving, from the second device, a reference signal comprises receiving a reference signal from the UE;

determining the channel state information based on the reference signal comprises determining uplink channel state information based on the reference signal received from the UE; and using the channel state information as an ML module input comprises using the uplink channel state information as the ML module input.

14. A device comprising:

a memory storing processor-executable instructions; and a processor for executing the processor-executable instructions to cause the device to:

obtain channel state information characterizing a wireless communication channel between the device and a second device in a wireless communication network; and obtain, based on the channel state information as an input to a machine learning (ML) module of the device that has been trained using channel state information characterizing a wireless communication channel between the device and the second device in the wireless communication network as an ML module input and one or more modulation and coding scheme (MCS) parameters as an ML module output, one or more MCS parameters for communication between the device and the second device, the one or more MCS parameters including a predicted modulation order, a predicted coding rate or both; and transmit to or receive from the second device over the wireless communication channel using the one or more MCS parameters, wherein the ML module of the device and a further ML module of the second device are trained to predict the same one or more MCS parameters.

15. The device of claim 14, wherein obtaining the channel state information comprises:

receiving, from the second device, a reference signal; and determining the channel state information based on the reference signal.

16. The device of claim 15, wherein the device is a user equipment (UE), the second device is a network device, the ML module used to obtain the one or more MCS parameters is trained to satisfy a training target of matching the one or more MCS parameters of the ML module output of the ML module of the UE to one or more MCS parameters predicted by the network device.

17. The device of claim 15, wherein the device is a user equipment (UE), the second device is a network device, wherein the processor-executable instructions, when executed, further cause the processor to:

obtain, based on the channel state information as an input to an ML encoder module of the UE, compressed channel state information; and transmit a channel state information report to the network device, the channel state information report comprising the compressed channel state information.

18. The device of claim 14, wherein the device is a user equipment (UE) and the second device is a network device, wherein the processor-executable instructions, when executed, further cause the processor to:

transmit, from the UE, a reference signal, wherein obtaining the channel state information comprises receiving, from the network device, a channel state information report that includes information indicating uplink channel state information determined by the network device based on the reference signal transmitted by the UE, and wherein using the channel state information as an ML module input comprises using the uplink channel state information as the ML module input.

19. The device of claim 14, wherein the device is a network device and the second device is a user equipment (UE), wherein the processor-executable instructions, when executed, further cause the processor to:

transmit, from the network device, a reference signal, wherein obtaining the channel state information comprises receiving, from the UE, a channel state information report that includes information indicating downlink channel state information determined by the UE based on the reference signal transmitted by the network device, and wherein using the channel state information as an ML module input comprises using the downlink channel state information as the ML module input.

20. The device of claim 15, wherein:

the device is a network device and the second device is a user equipment (UE);

receiving, from the second device, a reference signal comprises receiving a reference signal from the UE;

determining the channel state information based on the reference signal comprises determining uplink channel state information based on the reference signal received from the UE; and using the channel state information as an ML module input comprises using the uplink channel state information as the ML module input.

* * * * *